United States Patent
Jenkins et al.

(10) Patent No.: US 10,693,991 B1
(45) Date of Patent: Jun. 23, 2020

(54) REMOTE BROWSING SESSION MANAGEMENT

(75) Inventors: Jonathan A. Jenkins, Seattle, WA (US); Peter F. Hill, Seattle, WA (US); Brett R. Taylor, Bainbridge Island, WA (US); Samuel S. Gigliotti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/246,668

(22) Filed: Sep. 27, 2011

(51) Int. Cl.
*G06F 15/173* (2006.01)
*H04L 29/08* (2006.01)

(52) U.S. Cl.
CPC ...... *H04L 67/2847* (2013.01); *H04L 67/2852* (2013.01)

(58) Field of Classification Search
CPC ............. H04L 67/2842; H04L 67/2847; H04L 67/2852; H04L 67/2857; H04L 67/2861
USPC .................. 709/224–226, 217–219; 711/118
See application file for complete search history.

(56) References Cited

U.S. PATENT DOCUMENTS

| | | |
|---|---|---|
| 5,634,064 A | 5/1997 | Warnock et al. |
| 5,872,850 A | 2/1999 | Klein et al. |
| 5,961,593 A | 10/1999 | Gabber et al. |
| 6,049,812 A | 4/2000 | Bertram et al. |
| 6,108,637 A | 8/2000 | Blumenau |
| 6,138,156 A | 10/2000 | Fletcher et al. |
| 6,195,679 B1 | 2/2001 | Bauersfeld et al. |
| 6,425,057 B1 * | 7/2002 | Cherkasova .......... G06F 12/121 709/219 |
| 6,430,624 B1 | 8/2002 | Jamtgaard et al. |
| 6,549,941 B1 | 4/2003 | Jaquith et al. |
| 6,560,620 B1 | 5/2003 | Ching |

(Continued)

FOREIGN PATENT DOCUMENTS

WO WO 2013/003631 A2 1/2013

OTHER PUBLICATIONS

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

(Continued)

*Primary Examiner* — Abdulkader M Alriyashi
(74) *Attorney, Agent, or Firm* — Knobbe Martens Olson & Bear LLP

(57) ABSTRACT

A browsing process is directed to the generation and management of a browse session at a network computing provider. A client computing device requests a remote browse session instance at a network computing provider. The browse session instance may correspond to requested network content. The network computing provider determines a browse configuration. The browse configuration may identify a communication protocol and various processing actions. The network computing provider retrieves the requested content through an instantiated network browse session instance, and performs a first set of processing actions to generate a processing result. The processing result may be provided to the client computing device for display, including performing a second set of processing actions on the processing result at the client computing device. The processing result, or portions thereof, may be stored in a shared network cache and/or in a local cache.

22 Claims, 19 Drawing Sheets

(56) References Cited

U.S. PATENT DOCUMENTS

| | | |
|---|---|---|
| 6,625,624 B1 | 9/2003 | Chen et al. |
| 6,704,024 B2 | 3/2004 | Robotham et al. |
| 6,785,864 B1 | 8/2004 | Te et al. |
| 6,871,236 B2 | 3/2005 | Fishman et al. |
| 6,944,665 B2 | 9/2005 | Brown et al. |
| 6,963,850 B1 | 11/2005 | Bezos et al. |
| 7,003,442 B1 | 2/2006 | Tsuda |
| 7,051,084 B1 | 5/2006 | Hayton et al. |
| 7,054,952 B1 | 5/2006 | Schwerdtfeger et al. |
| 7,085,736 B2 | 8/2006 | Keezer et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,353,252 B1 | 4/2008 | Yang et al. |
| 7,373,313 B1 | 5/2008 | Kahle et al. |
| 7,543,059 B2 | 6/2009 | Johnson et al. |
| 7,792,944 B2 | 9/2010 | DeSantis et al. |
| 7,831,582 B1 | 11/2010 | Scofield et al. |
| 7,975,000 B2 | 7/2011 | Dixon et al. |
| 7,996,912 B2 | 8/2011 | Spalink et al. |
| 8,010,545 B2 | 8/2011 | Stefik et al. |
| 8,015,496 B1 | 9/2011 | Rogers |
| 8,060,463 B1 | 11/2011 | Spiegel |
| 8,073,850 B1 | 12/2011 | Hubbard et al. |
| 8,103,742 B1 | 1/2012 | Green |
| 8,185,621 B2 | 5/2012 | Kasha |
| 8,249,904 B1 | 8/2012 | DeSantis et al. |
| 8,271,887 B2 | 9/2012 | Offer et al. |
| 8,316,124 B1 | 11/2012 | Baumback et al. |
| 8,336,049 B2 | 12/2012 | Medovich |
| 2001/0039490 A1 | 11/2001 | Verbitsky et al. |
| 2002/0030703 A1 | 3/2002 | Robertson et al. |
| 2002/0194302 A1 | 12/2002 | Blumberg |
| 2003/0004882 A1* | 1/2003 | Holler et al. .................. 705/51 |
| 2003/0023712 A1 | 1/2003 | Zhao et al. |
| 2003/0041106 A1 | 2/2003 | Tuli |
| 2004/0068579 A1* | 4/2004 | Marmigere et al. ......... 709/242 |
| 2004/0083294 A1 | 4/2004 | Lewis |
| 2004/0103437 A1* | 5/2004 | Allegrezza ......... H04N 7/17336 725/95 |
| 2004/0139208 A1 | 7/2004 | Tuli |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2005/0010863 A1 | 1/2005 | Zernik |
| 2005/0060643 A1 | 3/2005 | Glass et al. |
| 2005/0108322 A1* | 5/2005 | Kline ............... G06F 17/30902 709/203 |
| 2005/0138382 A1 | 6/2005 | Hougaard et al. |
| 2005/0183039 A1 | 8/2005 | Revis |
| 2005/0246193 A1 | 11/2005 | Roever et al. |
| 2006/0077897 A1* | 4/2006 | Kotzin ......................... 370/235 |
| 2006/0085766 A1 | 4/2006 | Dominowska et al. |
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0179472 A1* | 8/2006 | Chang .................... H04L 63/10 726/2 |
| 2006/0184421 A1 | 8/2006 | Lipsky et al. |
| 2006/0248442 A1 | 11/2006 | Rosenstein et al. |
| 2006/0277167 A1 | 12/2006 | Gross et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | Blackwell et al. |
| 2007/0124693 A1 | 5/2007 | Dominowska et al. |
| 2007/0139430 A1 | 6/2007 | Korn et al. |
| 2007/0240160 A1 | 10/2007 | Paterson-Jones et al. |
| 2007/0288589 A1 | 12/2007 | Chen et al. |
| 2008/0028334 A1 | 1/2008 | De Mes |
| 2008/0104502 A1 | 5/2008 | Olston |
| 2008/0183672 A1 | 7/2008 | Canon et al. |
| 2008/0184128 A1 | 7/2008 | Swenson et al. |
| 2008/0320222 A1* | 12/2008 | Dhodapkar .................. 711/118 |
| 2008/0320225 A1 | 12/2008 | Panzer et al. |
| 2009/0012969 A1 | 1/2009 | Rail et al. |
| 2009/0164924 A1 | 6/2009 | Flake et al. |
| 2009/0204478 A1 | 8/2009 | Kaib et al. |
| 2009/0217199 A1 | 8/2009 | Hara et al. |
| 2009/0248680 A1 | 10/2009 | Kalavade |
| 2009/0254867 A1 | 10/2009 | Farouki et al. |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0036740 A1 | 2/2010 | Barashi |
| 2010/0057639 A1 | 3/2010 | Schwarz et al. |
| 2010/0125507 A1 | 5/2010 | Tarantino, III et al. |
| 2010/0131594 A1 | 5/2010 | Kashimoto |
| 2010/0138293 A1 | 6/2010 | Ramer et al. |
| 2010/0218106 A1 | 8/2010 | Chen et al. |
| 2010/0293190 A1 | 11/2010 | Kaiser et al. |
| 2010/0312788 A1 | 12/2010 | Bailey |
| 2010/0318892 A1 | 12/2010 | Teevan et al. |
| 2010/0332513 A1* | 12/2010 | Azar et al. .................... 707/769 |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0058490 A1* | 3/2011 | Mills et al. .................. 370/252 |
| 2011/0078140 A1 | 3/2011 | Dube et al. |
| 2011/0078705 A1 | 3/2011 | Maclinovsky et al. |
| 2011/0119661 A1 | 5/2011 | Agrawal et al. |
| 2011/0161849 A1 | 6/2011 | Stallings et al. |
| 2011/0173177 A1* | 7/2011 | Junqueira et al. ............ 707/709 |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0246873 A1 | 10/2011 | Tolle et al. |
| 2011/0289074 A1 | 11/2011 | Leban |
| 2011/0296341 A1 | 12/2011 | Koppert |
| 2011/0302510 A1 | 12/2011 | Harrison et al. |
| 2012/0072821 A1 | 3/2012 | Bowling |
| 2012/0084644 A1 | 4/2012 | Robert et al. |
| 2012/0096365 A1* | 4/2012 | Wilkinson et al. .......... 715/740 |
| 2012/0110017 A1 | 5/2012 | Gu et al. |
| 2012/0137201 A1 | 5/2012 | White et al. |
| 2012/0143944 A1 | 6/2012 | Reeves et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0215834 A1* | 8/2012 | Chen ................ G06F 17/30905 709/203 |
| 2012/0215919 A1 | 8/2012 | Labat et al. |
| 2012/0284629 A1 | 11/2012 | Peters et al. |
| 2012/0317295 A1 | 12/2012 | Baird et al. |
| 2012/0331406 A1 | 12/2012 | Baird et al. |
| 2013/0007101 A1 | 1/2013 | Trahan et al. |
| 2013/0007102 A1 | 1/2013 | Trahan et al. |
| 2013/0031461 A1 | 1/2013 | Hou et al. |
| 2013/0080611 A1* | 3/2013 | Li et al. ....................... 709/223 |

OTHER PUBLICATIONS

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Bango, Rey "How JS & Ajax work in Opera Mini 4", Nov. 2, 2007, XP055050107, Retrieved from the Internet.

Brinkmann, M, "Record and Share your browser history with Hooeey," ghacks.net, Feb. 26, 2008, 6 pages, printed on Jan. 25, 2013.

Considine, A, "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

(56) References Cited

OTHER PUBLICATIONS

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.
Gabber et al., "How to Make Personalized Web Browsing Simple, Secure, and Anonymous," Financial Cryptography, 16 pages (1997).
Gingerich, Jason, "Keycorp Making Site Into Portal," KRTBN Knight-Ridder Tribune Business News (South Bend Tribune, Indiana), Oct. 25, 1999, 2 pages.
Hopper, D. Ian, "Desktops Now Have Power to Comparison-Shop," Oct. 18, 1999, printed from http://www.cnn.com/TECH/computing/9910/18/r.u.sure/index.html, 3 pages.
Van Kleek, M, Introducing "Eyebrowse"—Track and share your web browsing in real time, Haystack Blog, Aug. 28, 2009, 3 pages, printed on Jan. 25, 2013.
Web page titled "RSS Ticker: Add-ons for Firefox," https://addons.mozilla.org/en-US/firefox/addon/rss-ticker/, 3 printed pages, printed on Feb. 7, 2013.
Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.
Rao, H.C.-H. ,et al., "A Proxy-Based Personal Web Archiving Service," Operating Systems Review, 35(1):61-72, 2001.
Teevan, J., et al., "Changing How People View Changes on the Web," 2009, Proceedings of the $22^{nd}$ Annual ACM Symposium on User Interface Software and Technology, New York, 2009, pp. 237-246.
Chen, H., et al., "Bringing Order to the Web: Automatically Categorizing Search Results," Proceedings of the SIGCHI Conference on Human Factors in Computing Systems, Apr. 1-6, 2000, pp. 145-152.

\* cited by examiner

REMOTE BROWSING SESSION MANAGEMENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HTML layout information and references to associated resources, may identify and process Cascading Style Sheets ("CSS") information, may process and instantiate various Javascript code associated with the Web page, may construct a native object model to represent one or more components of the Web page, and may calculate various layout and display properties of the processed content for presentation to a user.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, and rendering content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
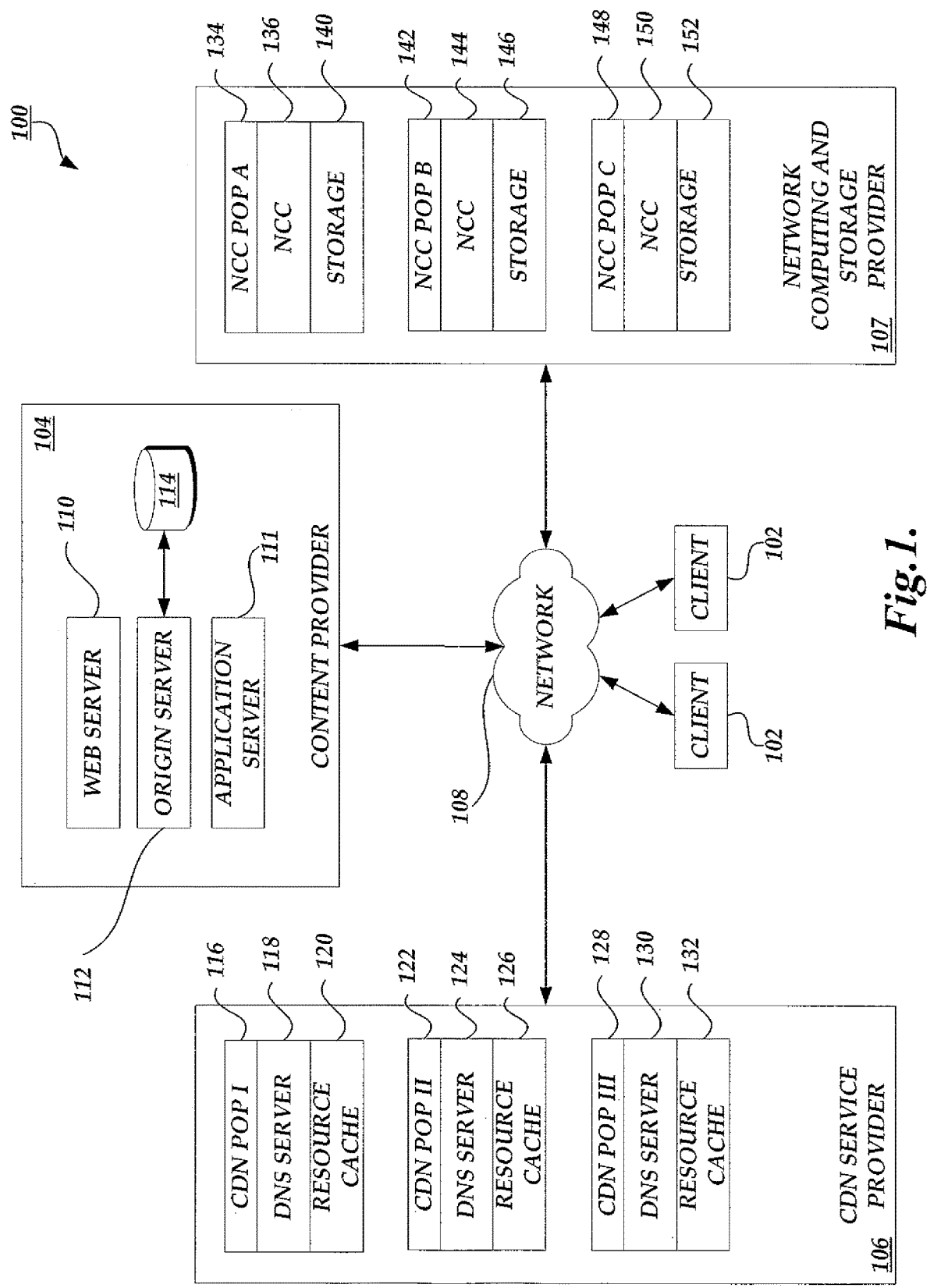
FIG. 1 is a block diagram illustrative of a content delivery environment including a number of client computing devices, content provider, a content delivery network service provider, and a network computing provider.

Generally described, the present disclosure is directed to the generation and management of a remote application session between client computing devices and content providers in conjunction with a network computing provider. Specifically, aspects of the disclosure will be described with regard to the request for a browse session by a client computing device with a content provider, the establishment of a remote browse session between the client computing device and a network computing provider, and the transmission of browse session state data and client interaction data between the client computing device and the network computing provider. Although aspects of the embodiments described in the disclosure will focus, for the purpose of illustration, on the management of a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing provider across a private or public network. The browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a new browse session to the network computing provider, including the selected URL. The address or location of a network computing provider capable to service the browse session request may be hardcoded into the browser, may be configurable by the user, may be obtained from a network address service, or may be determined in any other way.

In an illustrative embodiment, responsive to the browse session request received from the client computing device, the network computing provider may instantiate or cause to have instantiated one or more computing components associated with the network computing provider that will host a browser software application. For example, the network computing provider can instantiate, or cause to have instantiated, an instance of a virtual machine that includes a software browser application capable of requesting resources from a communication network. Illustratively, in some situations, one or more devices associated with the network computing provider may be located in a data center or other robustly networked computing environment, and, as compared to the client computing device, may experience relatively little latency or delay when obtaining network resources.

Using the instantiated network computing components, the network computing provider may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources, or content may include any file type or format known in the art and supported by the specific software application.

Having obtained the requested content (e.g., the requested network resource and embedded resources), the network computing provider may identify a remote session browsing configuration specifying a remote session communication protocol for use in transmitting the requested content, user interaction data, intermediate processing results, and other information between the browser being executed on the client computing device and the browser being executed at the instantiated network computing component on the computing and storage provider. The information exchanged between the browser on the instantiated network computing component and the browser on the client computing device can be generally referred to as "browser session information."

In addition to specifying a remote session communication protocol for transmitting information between the client computing device and the instantiated network computing component, in one embodiment, the identified remote session browsing configuration may specify that one or more processing actions to be performed on the requested content are to be performed at the network computing provider rather than, or in addition to, at the client computing device For purposes of illustration, the processing of network content by a browser may involve various processing actions before content can be rendered in an appropriate form on a client computing device. A Web page, for example, may be parsed and processed to process various HTML layout information and references to associated resources or embedded content such as CSS style sheets and Javascript, as well as embedded content objects such as images, video, audio, etc. Each object or piece of code may be parsed and processed before a representative object model corresponding to the web page may be constructed and processed further for layout and display. In accordance with the selected remote session browsing configuration, the client computing device and the instantiated network computing component may exchange processing results via browser session information (e.g., state data or display data representing the requested content).

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

Figure 2A:
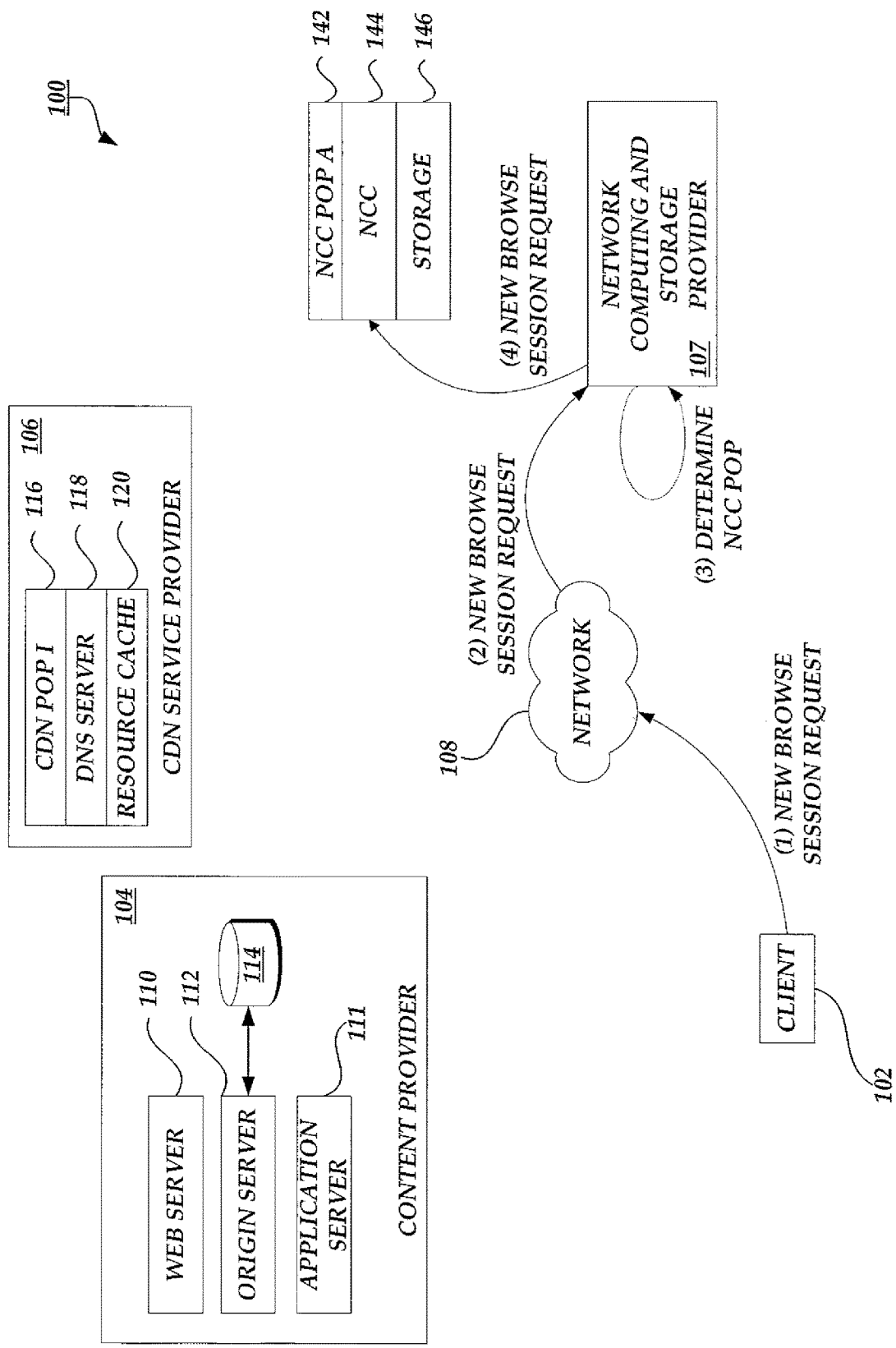
FIG. 2A is a block diagram of the content delivery environment of FIG. 1 illustrating the generation and processing of a new browse session request from a client computing device to a network computing provider.
Figure 4A:
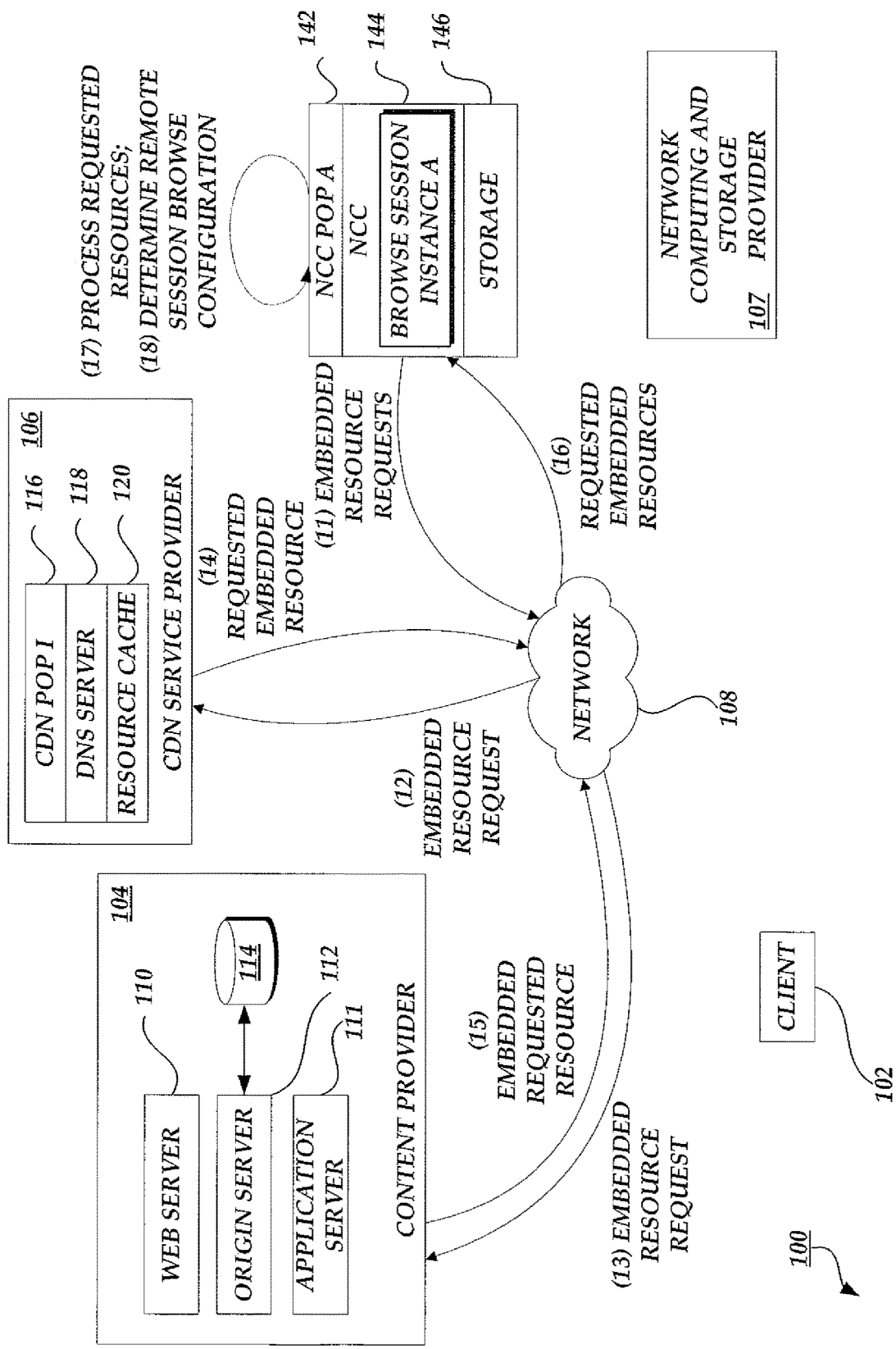
FIG. 4A is a block diagram of the content delivery environment of FIG. 1 illustrating the generation and processing of one or more requests corresponding to one or more embedded resources from a network computing provider to a content provider and content delivery network.
Figure 4B:
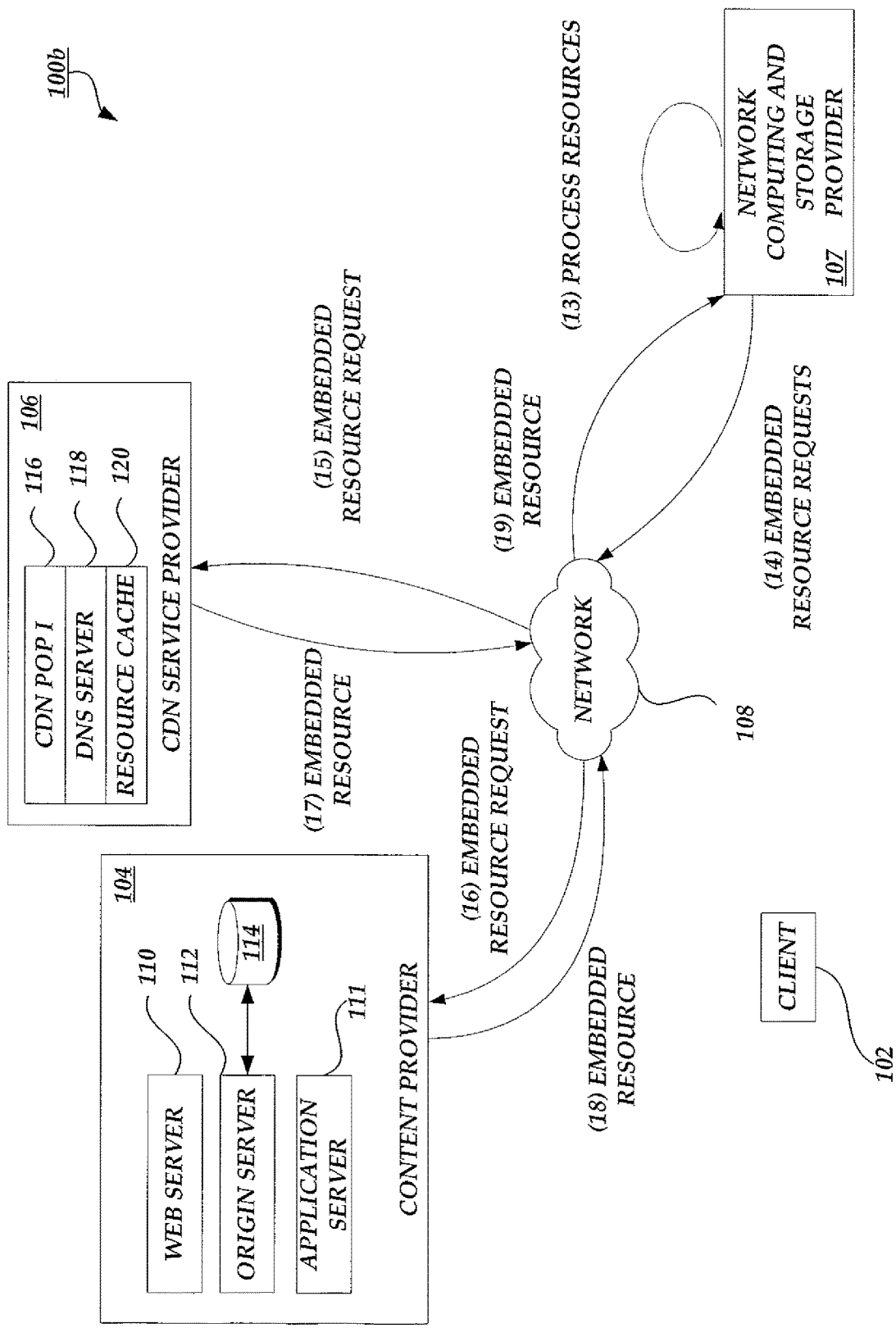
FIG. 4B is a block diagram of the content delivery environment of FIG. 1 illustrating the processing of a network resource and example requests, issued to content sources, for embedded resources.
Figure 5A:
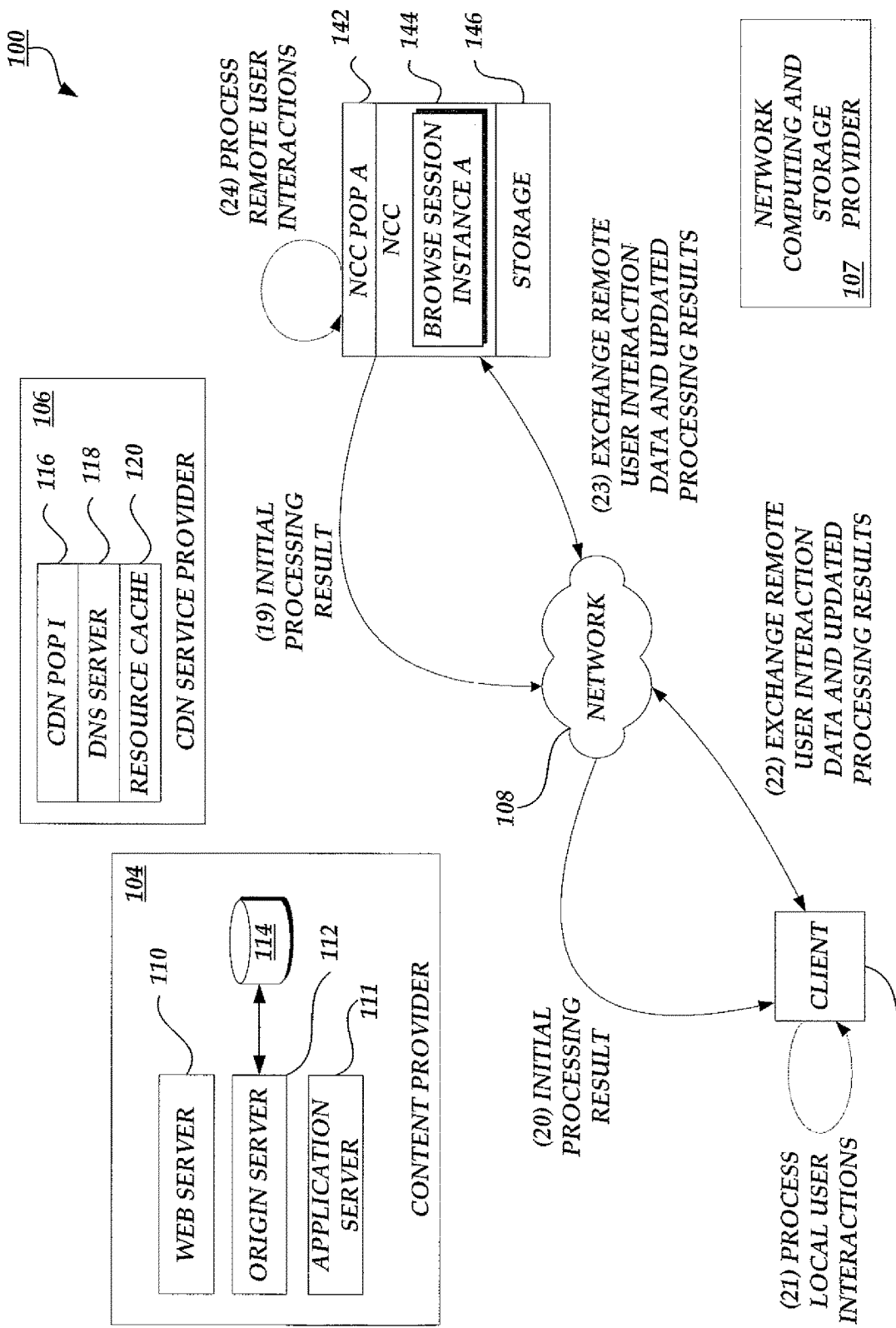
FIG. 5A is a block diagram of the content delivery environment of FIG. 1 illustrating the generation and processing of browse session data and user interaction data between a network computing provider and client computing device.
Figure 5B:
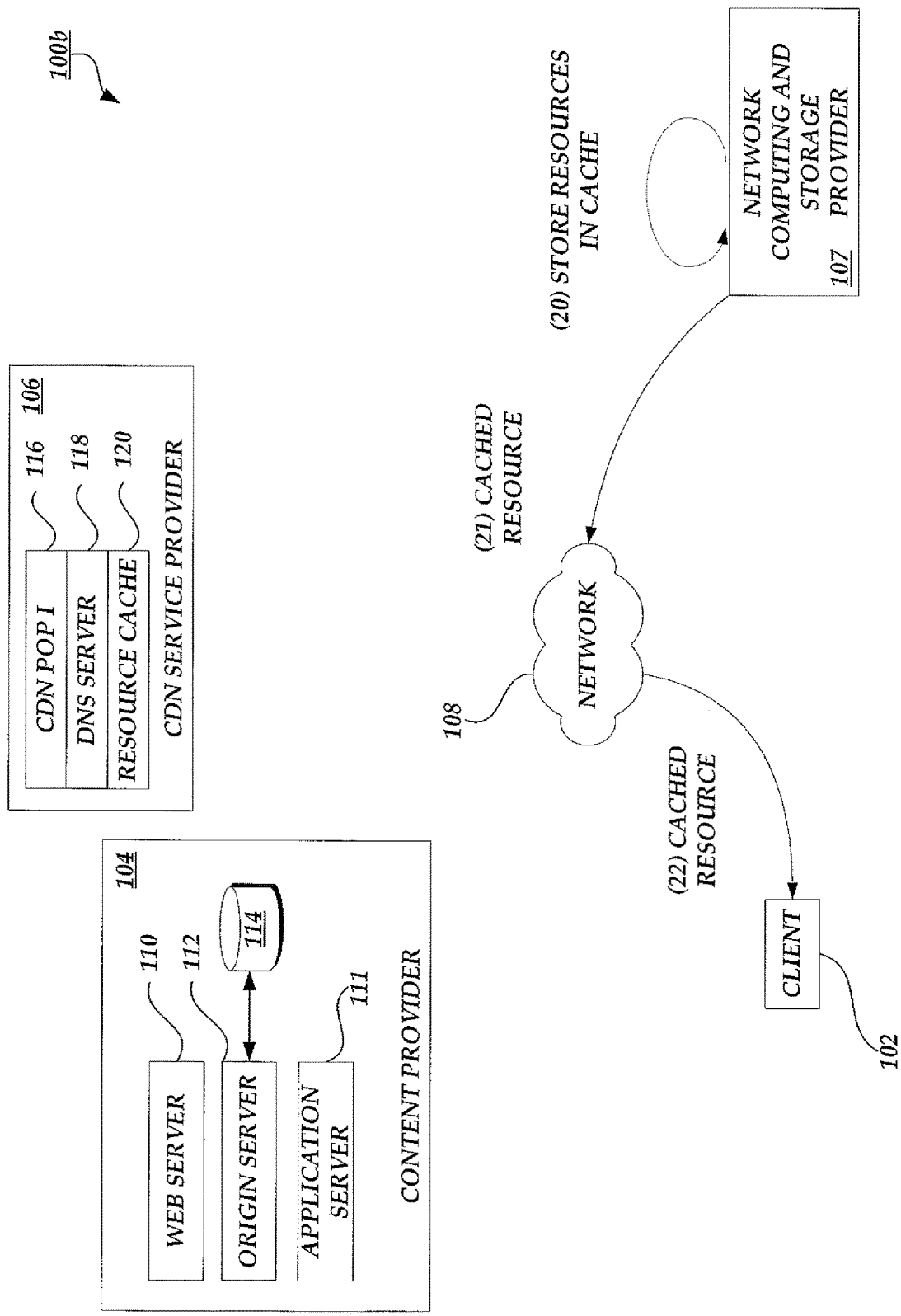
FIG. 5B is a block diagram of the content delivery environment of FIG. 1 illustrating the caching of a resource and the transmission of a cached resource from a network computing provider to a client computing device.
Figure 6:
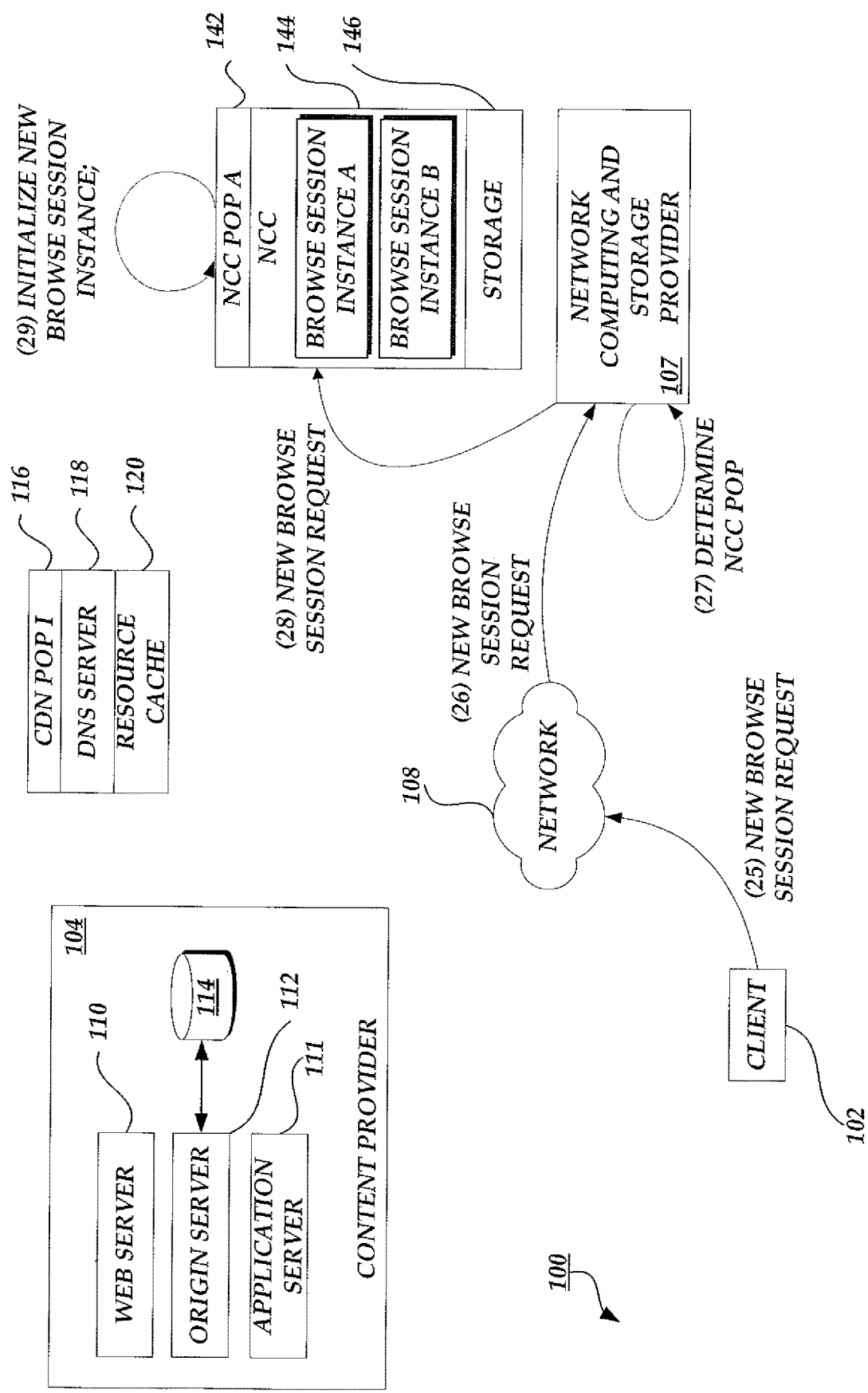
FIG. 6 is a block diagram of the content delivery environment of FIG. 1 illustrating the generation and processing of an additional new browse session request from a client computing device to a network computing provider.

With reference now to FIG. 2A through FIG. 6, the interaction between various components of the networked computing environment 100 of FIG. 1 will be illustrated. Specifically, FIGS. 2A-5A illustrate the interaction between various components of the networked computing environment 100 for the exchange of content between a client computing device 102 and a content provider 104 via the network computing provider 107. FIGS. 2B-5B illustrate another example interaction between various components of the networked computing environment 100b including the caching of network resources at the network computing provider 107 and/or the client computing device 102. FIG. 6 illustrates the generation and processing of additional interactions between various components of the network computing environment, for example interactions which may occur before, during, or after those illustrated in FIGS. 2A-5A and/or FIGS. 2B-5B. For purposes of the examples, however, the illustrations have been simplified such that many of the components utilized to facilitate communications are not shown. One skilled in the relevant art will appreciate that such components can be utilized and that additional interactions would accordingly occur without departing from the spirit and scope of the present disclosure.
Example Network Computing Environment Providing Remote Browsing Session Management With reference to FIG. 2A, the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2A, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3A:
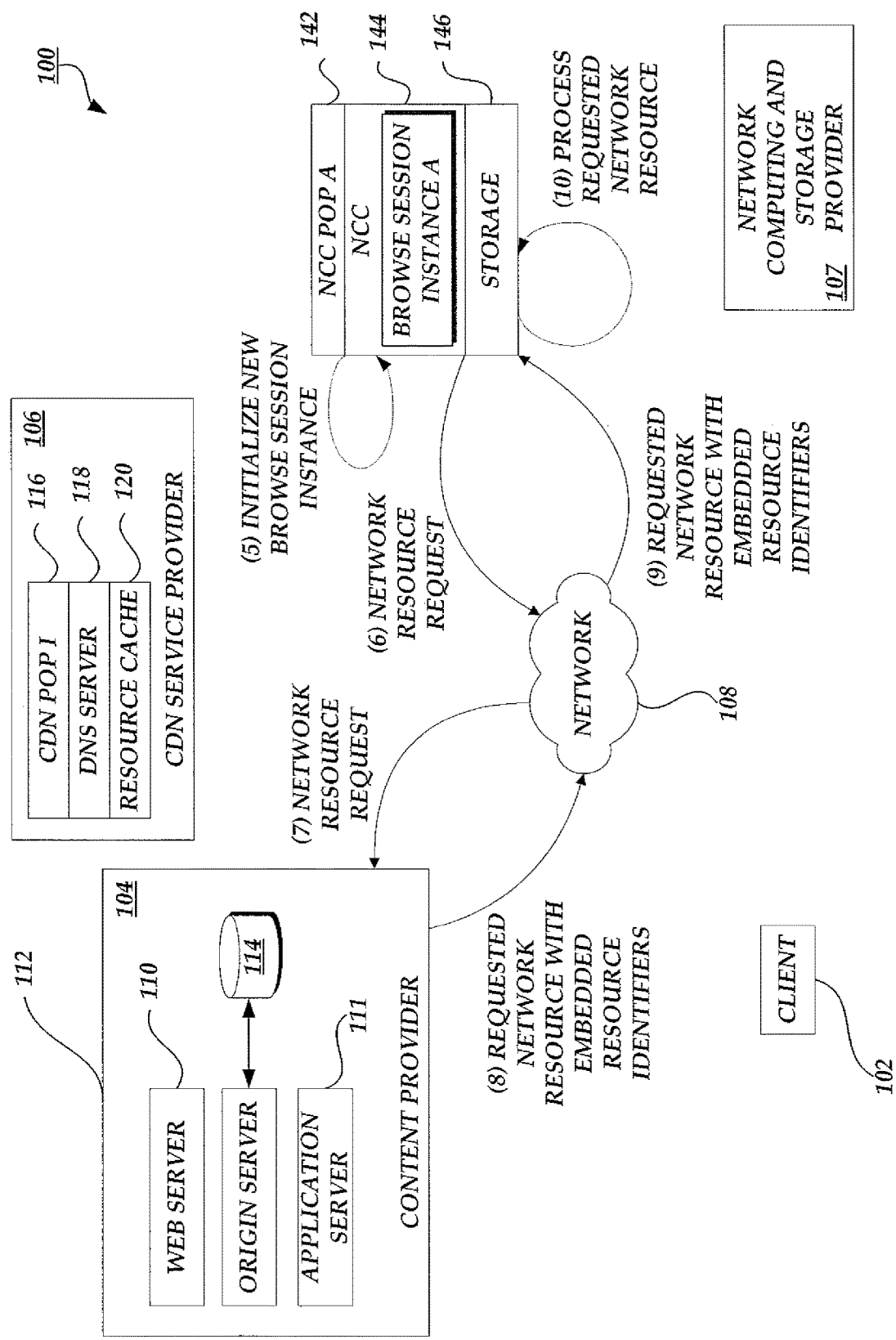
FIG. 3A is a block diagram of the content delivery environment of FIG. 1 illustrating the generation and processing of a request for a network resource from a network computing provider to a content provider.

With reference to FIG. 3A, an illustrative interaction for generation and processing of a request for a network resource from a network computing provider 107 to a content provider 104 will be described. As illustrated in FIG. 3A, the selected NCC POP 142 may generate a browse session corresponding to one or more content providers based on a browse session request, such as the illustrative browse session request depicted in FIG. 2A above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3A, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3A above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

With reference to FIG. 5A, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5A, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device in response to changes to the content or remote user interaction data from the client computing device.

With reference to FIG. 6, a block diagram of the content delivery environment of FIG. 1 illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2A and 3A, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2A, a network computing provider 107 may select an NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2A.

Example Network Computing Environment Providing Network Resource Caching

FIGS. 2B-5B illustrate another embodiment of a networked computing environment 100b. The features and processes illustrated in FIGS. 2B-5B and described below can be performed in addition to, or independent of, the processes shown in FIGS. 2A-5A and described above. Some components and features described above with respect to FIGS. 2A-5A have been omitted or simplified. Each of the process and features described below, however, can occur in the networked computing environment 100 described above. For example, the processes described below can also be performed by an NCC 144, POP 142, or other component, as illustrated in FIGS. 2A-5A above. The description of caching that follows will use the network computing provider 107 in general as the source of these functions for illustrative purposes only; the NCC 144, POP 142 or another component can be substituted for the network computing provider 107 without departing from the scope of this disclosure. In some embodiments, the network computing provider 107 can be a distributed system comprised of two or more physical computing devices.

Figure 2B:
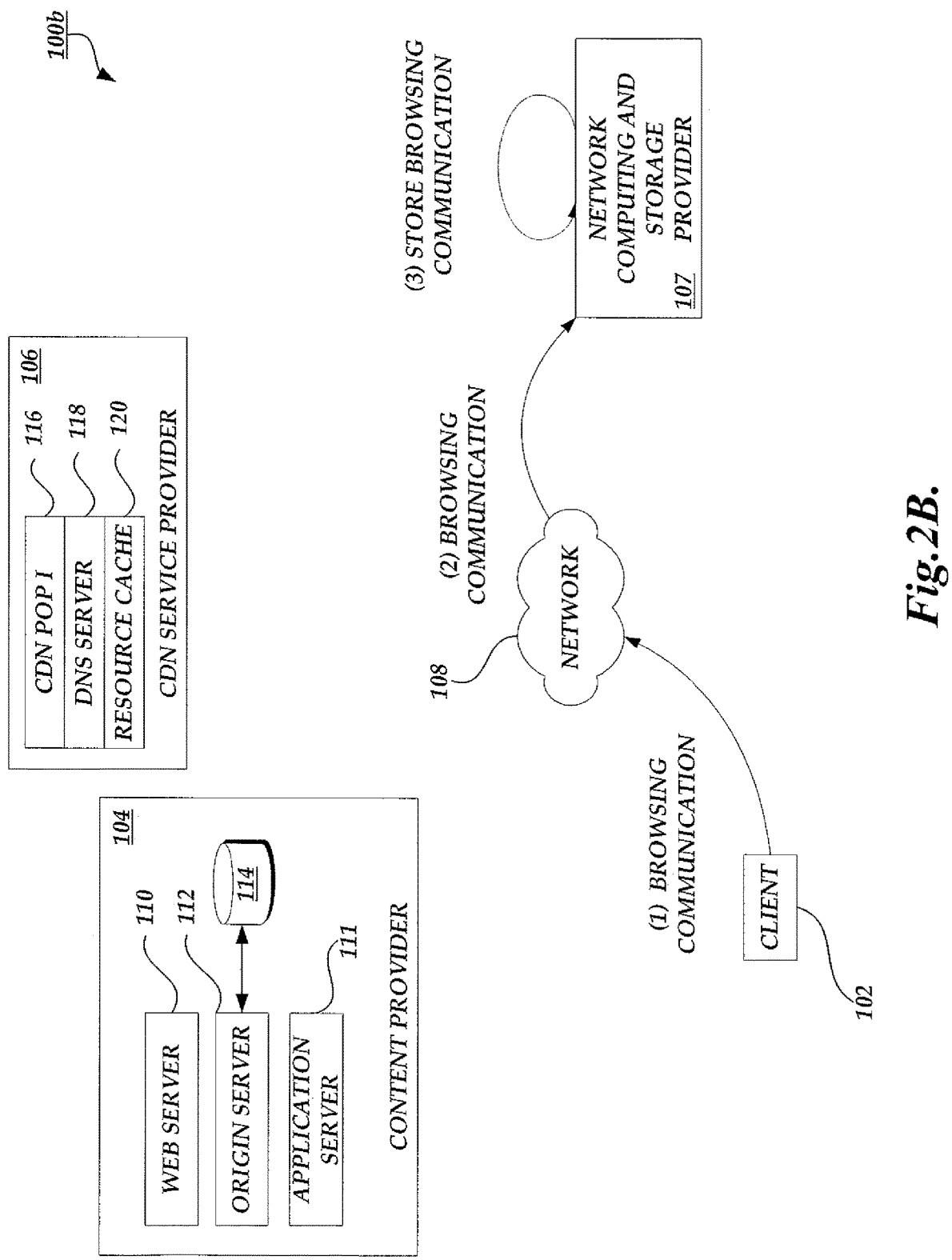
FIG. 2B is a block diagram of the content delivery environment of FIG. 1 illustrating the generation and processing of a new browsing communication from a client computing device to a network computing provider.

The networked computing environment 100b of FIG. 2B can exchange browsing communications, determine caching candidates, retrieve resources, and return cached resources. Illustratively, a client computing device 102 can transmit a browsing communication (1), (2) to a network computing provider 107 over a network 108. The browsing communication (1), (2) can be a request for a resource, a browse session request, etc. When the network computing provider receives the browsing communication (1), (2), it can store the communication (3) for future processing. As described in detail below with respect to FIGS. 3B-5B, one or more browsing communications (1), (2) can form the basis for a caching process, wherein network resources from content providers 104, CDN providers 106, origin servers, and other content sources are cached and provided to client computing devices 102.

Figure 3B:
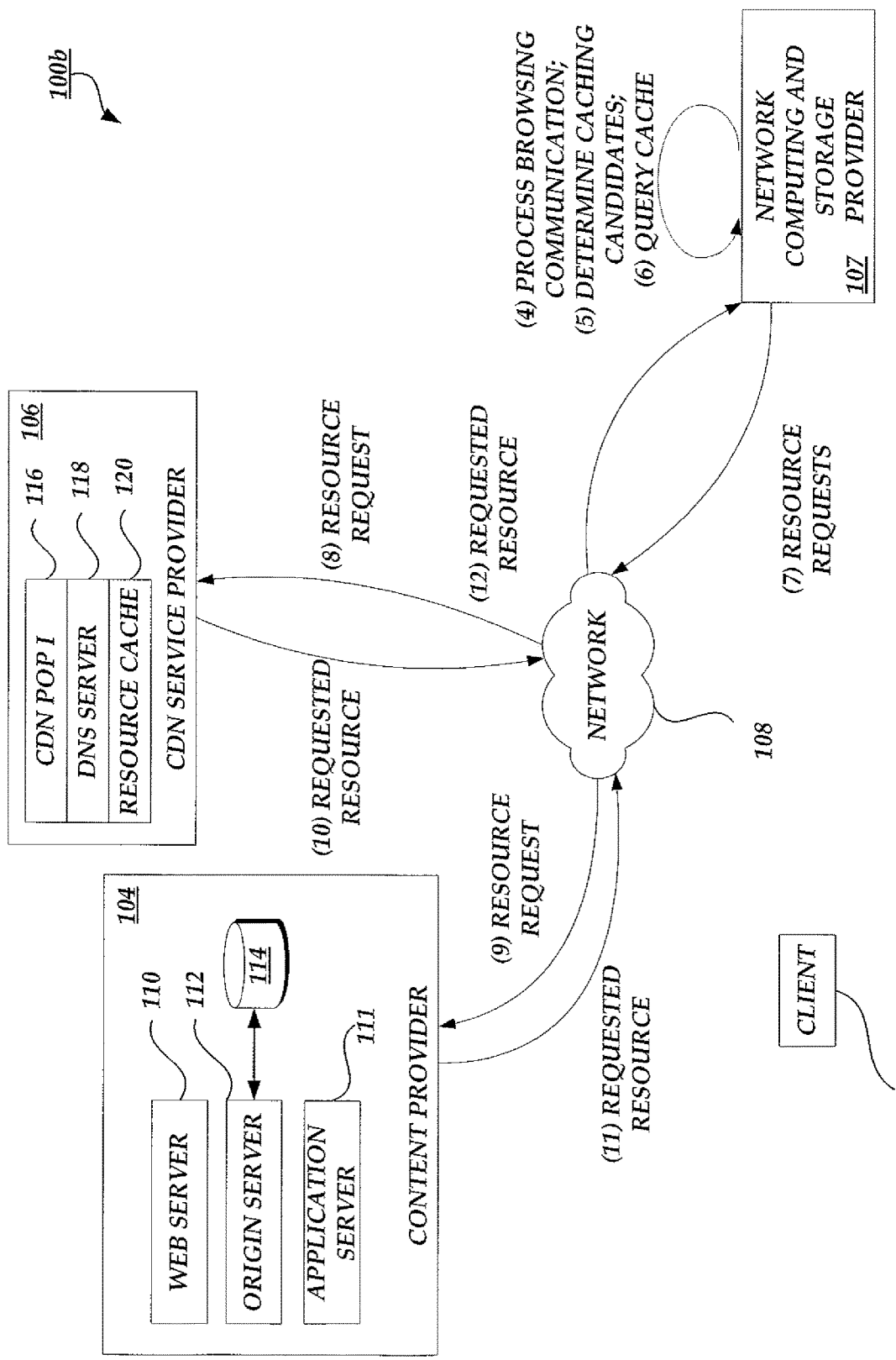
FIG. 3B is a block diagram of the content delivery environment of FIG. 1 illustrating the processing of a browsing communication and example requests, issued to content sources, for resources.

With reference to FIG. 3B, further processing related to the caching of network resources is illustrated, continuing the example of FIG. 2B, above. As illustrated in FIG. 3B, the network computing provider 107 can process the browsing communication (4). For example, if the browsing communication is a request for a network resource, such as a web page, image file, video file, and the like, the network computing provider 107 can determine the additional resources that may be required in order to respond to a browsing request, and then determine which resources may be candidates for caching (5). The cache candidates can include resources directly responsive to a browsing request, or may be other resources. For example, other resources can include predicted resources which have a heightened probability of being requested due to the current user of the client computing device 102, the current browsing session history, popularity rankings of resources requested by other users, etc. The network computing provider 107 can then query (6) a shared cache to determine if any of the resources identified thus far—including both those responsive to the current browsing request and those which are predicted to be responsive to future browsing requests—are present in the cache. When a resource is not present in the cache or is not up-to-date, the network computing provider 107 can transmit a resource request (7) over a network 108 to various content sources. For example, a resource request (8) can be sent to a CDN provider 106. A resource request (9) can also be sent to a content provider 104. The content sources can respond with the requested resource (10), (11), which is transmitted over the network 108, and finally the requested resource (12) can be received by the network computing provider 107.

FIG. 4B illustrates the processing (13) of resources received from the content provider 104, CDN provider 106, or other content source. For example, an HTML file may include references to various resources which are to be embedded within the page that the HTML file defines. Such embedded resources can be determined during the processing (13) of the HTML file. The network computing provider 107 can then request (14), (15), (16) the embedded resources and receive (17), (18), (19) the embedded resources from the content sources in a manner similar to the resource requests described above. In some cases, the interactions illustrated in FIG. 4B can continue in an iterative or recursive fashion. For example, there may be more than one resource received during the process illustrated in FIG. 3B. In such a case, the process illustrated in FIG. 4B can be executed iteratively for each resource. Alternatively, an embedded resource received during the process illustrated in FIG. 4B may itself have references to embedded resources which must be processed and requested. In such cases, the process illustrated in FIG. 4B can be executed recursively for each embedded resource received.

FIG. 5B illustrates the network computing provider 107 storing a requested network resource in cache (20). At some point, whether in response to a browsing communication from a client computing device 102 or initiated by the network computing provider 107 itself, the cached resource (21) can be transmitted over the network 108. The cached resource (22) can be received by the client computing device, and stored in a local cache, processed for display, etc.

Figure 7:
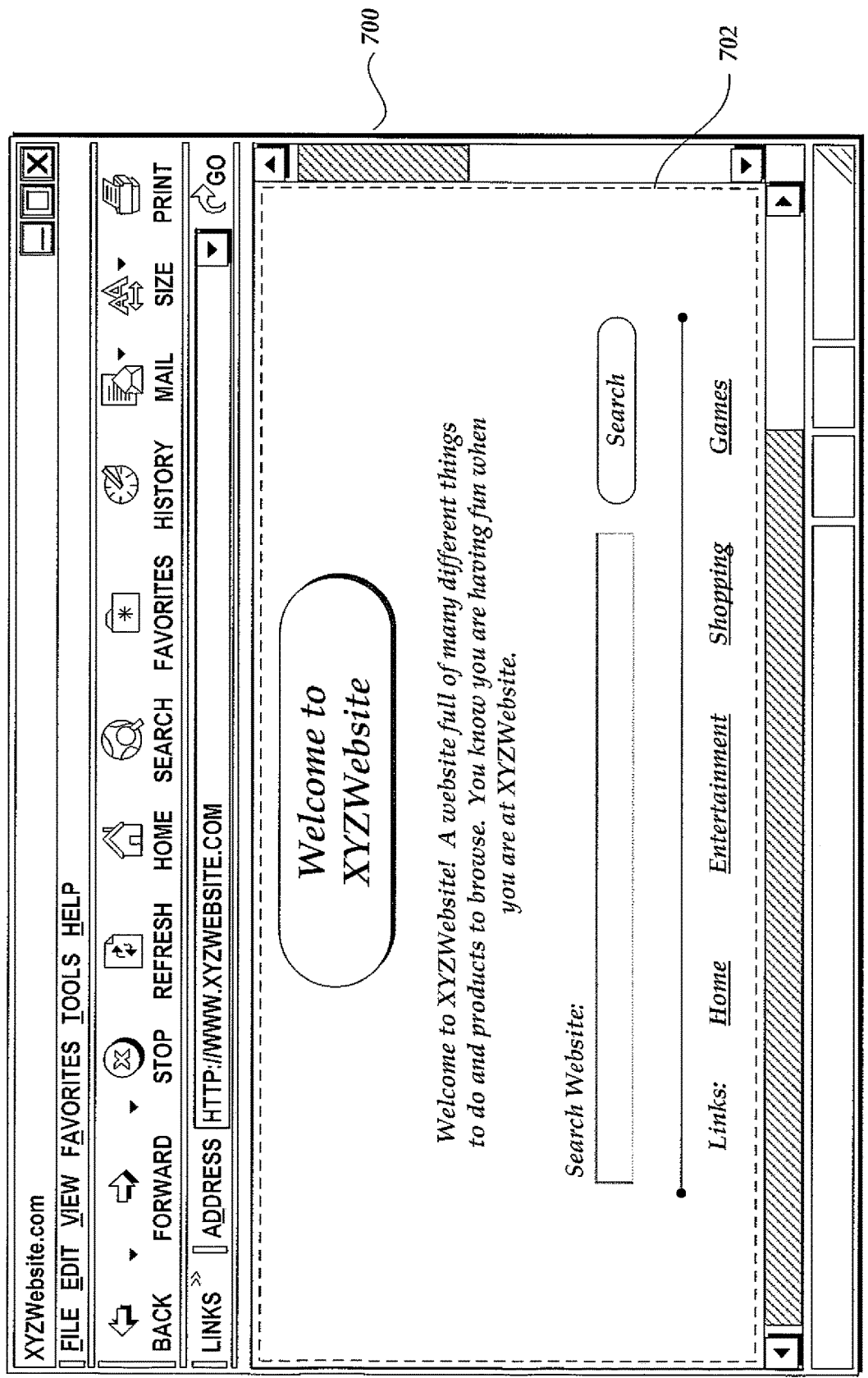
FIG. 7 is a user interface diagram depicting an illustrative browser interface and display of browse session content.

FIG. 7 is a user interface diagram depicting an illustrative browser interface and display of browse session content. As described above with reference to FIG. 5A, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 8:
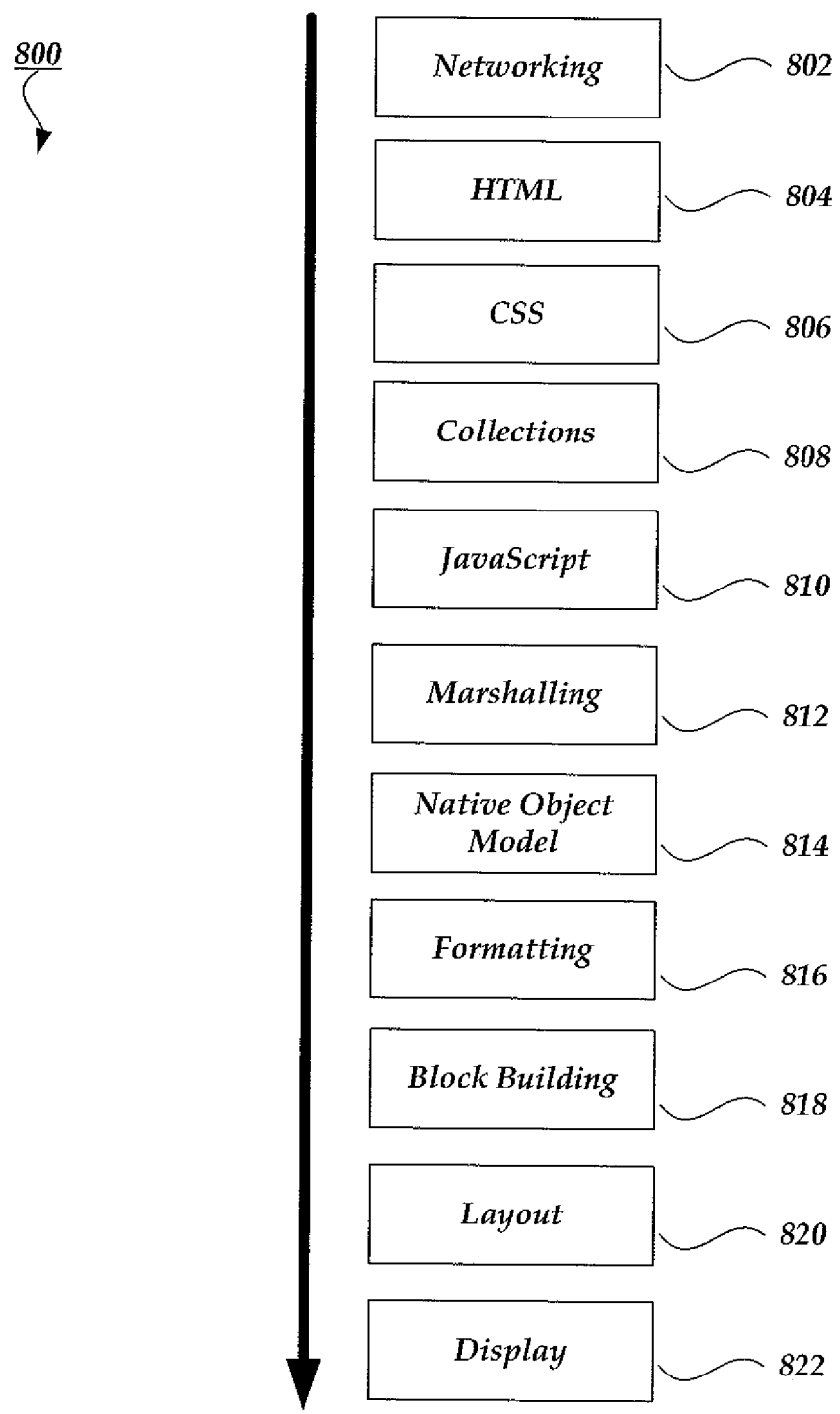
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3A5A, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Example Methods for Providing Remote Browsing Session Management

Figure 9:
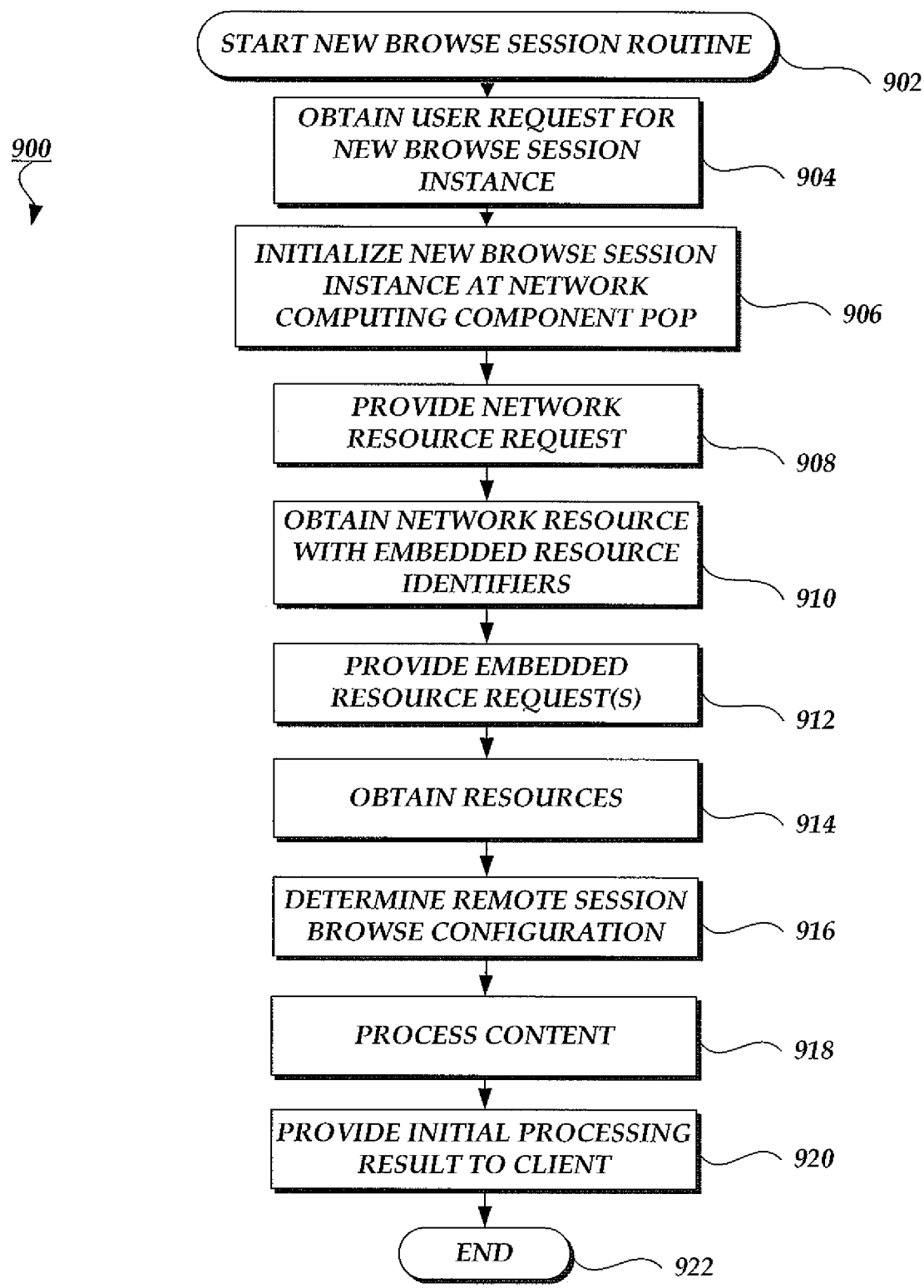
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 102 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session browsing configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
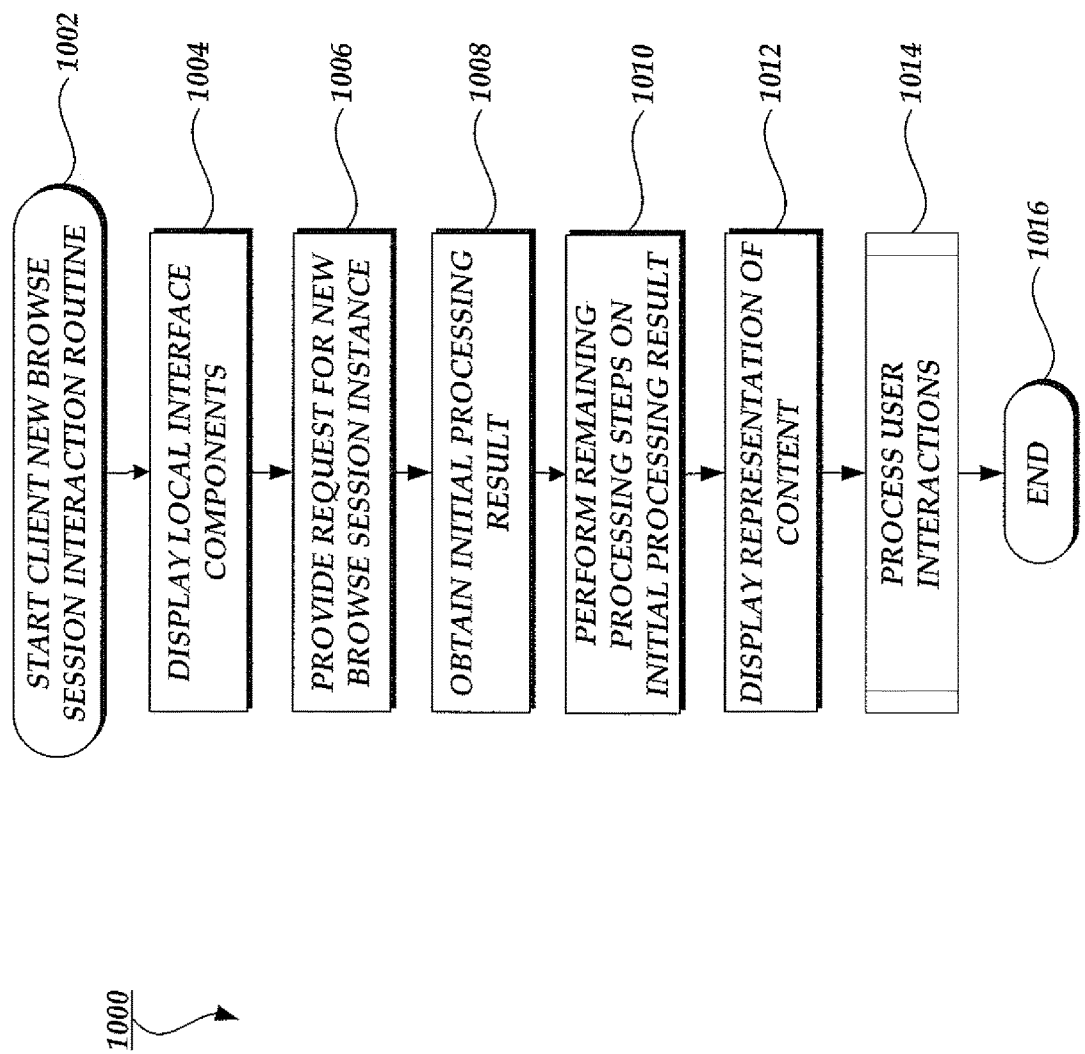
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2A, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
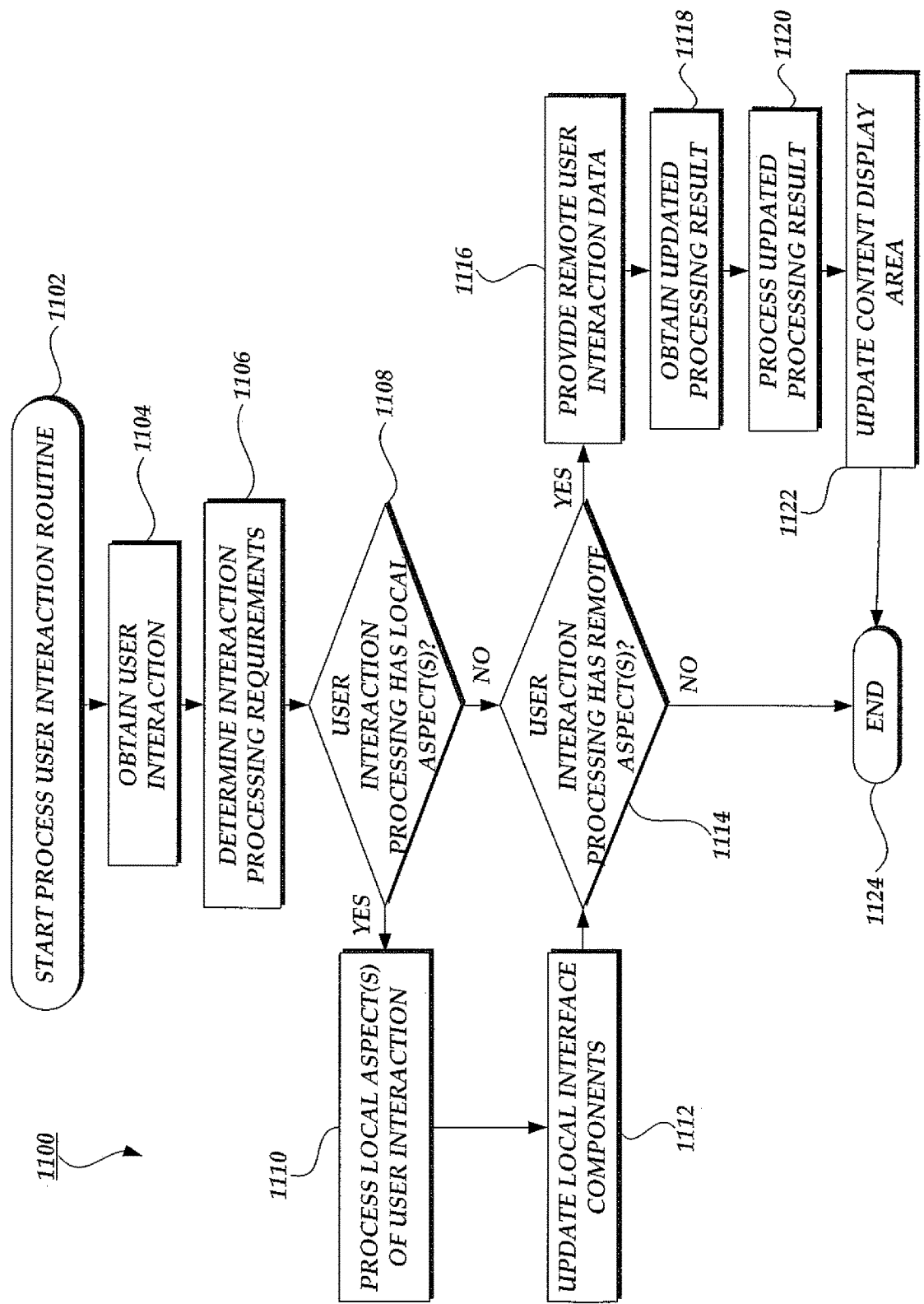
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1100 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1100 moves to decision block 1114. If the user interaction has remote aspects that require processing, the routine 1100 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1100 ends. Illustratively, the routine may be executed again any number of times in response to further user interactions with the browser and displayed content.

With reference now to FIGS. 12-16, the caching of resources at various components of the networked computing environment 100 of FIG. 1 will be illustrated. Specifically, FIGS. 12-15 are flow diagrams illustrating the interaction between various components of the networked computing environment 100 for the retrieval and caching of network resources at the network computing provider 107 or the client computing device 102. As described above, and with reference to FIGS. 2B-5B, the network computing provider's 107 network connection and proximity to content providers 104, CDN providers 106, origin servers, and other content sources may reduce latency, increase bandwidth, and generally facilitate improved performance when compared to network connections between the client computing device 102 and the content providers 104, CDN providers 106, origin servers, and other content sources. To take advantage of this position, the network computing provider 107 can cache some or all of the resources that it receives from the content sources.

A network computing provider 107 can include a proxy server which employs one or more shared caches to store network resources, such as web pages, previously received from content sources. Such shared caches reduce the amount of data that needs to be transmitted across the network 108 with each browsing request, as resources previously stored in the shared cache can often be re-used. This reduces the bandwidth and processing requirements of the network computing provider 107, and helps to improve responsiveness for users of client computing devices 102 accessing the networked computing environment 100. In some embodiments, the NCC 144, POP 142, or another component can perform these functions. The description of caching that follows will use the network computing provider 107 in general as the source of these functions for illustrative purposes only; the NCC 144, POP 142 or another component can be substituted for the network computing provider 107 without departing from the scope of this disclosure.

The configuration of the network computing provider 107 as an intermediary between the client computing devices 102 and the content providers 104 provides other benefits, such as the opportunity to recognize browsing patterns among individual end users and also among groups of end users. A module or component of the network computing provider 107 can analyze these browsing patterns and predict which resources an individual or group of end users are most likely to request in the near future, such as during a current browsing session or a future browsing session. These predictions can be used to actively retrieve and cache the resources, in some cases before they are requested, and in some cases without initialization of a browsing session by a client computing device 102. In some embodiments, the prediction can encompass resources that have never been specifically requested. For example, a prediction can be made, based on a pattern of browsing requests for resources associated with a "latest news" portion of a web site, that similar resources from another portion of the web site or from a different web site altogether will be requested later in the same browsing session. Such a prediction can be made even though the predicted resources have not yet been created and they may detail real-world events which have not yet transpired when the prediction is made.

Figure 12:
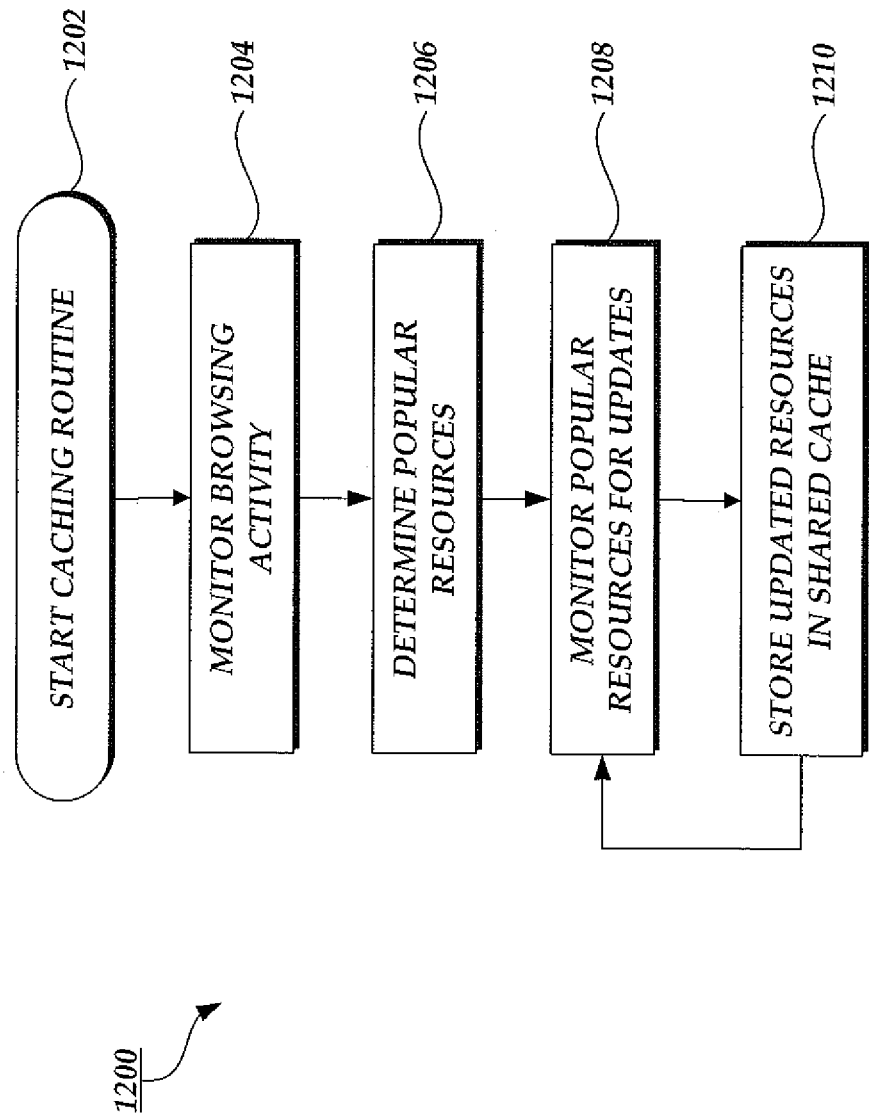
FIG. 12 is a flow diagram illustrative of a caching routine implemented by a network computing provider.

FIG. 12 illustrates an example caching routine 1200 implemented by the network computing provider 107 to cache resources that are likely to be accessed in the future. The routine 1200 can determine which resources are requested often, and are therefore likely to be requested in the future, based on patterns in previous browsing requests. The network computing provider 107 can process browsing requests for any number of separate client computing devices 102, and is therefore in a position to recognize patterns in the browsing requests. The network computing provider 107 can use those patterns to determine the popular resources and can actively monitor those resources for changes, caching the changes as they occur. This can speed up the delivery of the popular resources to client computing devices 102 when they are requested, because the resource can be retrieved from the shared cache rather than from the content provider 104, CDN provider 106, origin server, or other content source. In some embodiments, resources can be delivered to client computing devices 102 before they are requested, further reducing the network traffic to the client computing device 102 when the resource is requested because the resource can be loaded directly from a local cache on the client computing device 102, as described in detail below.

At block 1202, the network computing provider 107 begins executing the pre-caching routine 1200. The routine 1200 can be initialized by a system administrator of the network computing provider 107, can be scheduled to execute at certain times, can be a continuously running process on one or more network computing providers 107, etc. After initialization, the routine 1200 proceeds to block 1204.

At block 1204, the routine 1200 monitors the browsing requests received from the various client computing devices 102. As described in detail above, the network computing provider 107 receives browsing requests from a variety of client computing devices 102. The network computing provider 107 can monitor those requests. Information about the requests can be stored in a data store for use in block 1206, below. For example, the information can be electronically stored in memory, a database, on a hard disk, etc. The information can include a resource identifier for each resource that has been requested, the time of day and/or day of the week that each resource was requested, etc. At various times, execution of the routine 1200 can proceed to block 1206. For example, the routine 1200 can proceed to block 1206 on a predetermined schedule, after a number of browsing requests have been received, when instructed to by the system administrator, etc. When execution proceeds to block 1206, the monitoring step of block 1204 can continue to execute indefinitely, until terminated by the system administrator, until terminated on a predetermined schedule, etc.

At block 1206, the routine 1200 can determine popularity information and rank various resources based, at least in part, on popularity information. Illustratively, popularity information can be defined any number of different ways, including a count of the raw number of received requests, an average number of received requests by a set of client computing devices over a period of time, weighted average of received request in which weighting is based on certain environmental and other factors into consideration, and the like. To make this determination, the network computing provider 107 can access the information that was stored in block 1204, above. The network computing provider 107 can utilize any number of techniques to analyze the information, including summing the number of requests for each resource, applying statistical or machine learning algorithms, etc. The network computing provider 107 can store information about the most popular resources for use in block 1208, below. The information can include a network address for the resource, such as an IP address, the date the resource was last requested, the number of times it was requested, etc. The information can be electronically stored in a database, in memory, on a hard disk, etc. In some embodiments, the popularity of a resource can vary based on the time of the day, the day of the week, etc. These temporal factors can alter the ranking of the resources. For example, a new web site may be the most popular resource in the morning, while a theatre schedule may be more popular at night, etc. In some embodiments, geographic factors can alter the ranking of the resources.

The routine 1200 then proceeds to block 1208, where it monitors the popular resources, as determined in block 1206 above. In order to realize the benefits of caching, the cached resources are preferably kept current, otherwise an out-of-date resource will be retrieved from cache, or the updated resource will need to be retrieved from its content source when it is requested, defeating the purpose of a cache. In order to increase the likelihood that the cached resources are current, the resources at the content provider 104 or origin server can be monitored or periodically polled to determine if they have changed since the resource was last stored in cache. In some embodiments, the network computing provider 107 can poll each resource at predetermined or dynamically calculated intervals, proceeding to block 1208 to cache those resources that have changed since the last time they were polled. In some embodiments, the routine 1200 can use automated techniques, including bots, web crawlers, indexers, and the like to continuously monitor the popular resources. Block 1208 works closely with block 1210, which can be performed sequentially after block 1208, as a parallel process invoked by block 1208, etc.

At block 1210, the routine 1200 stores the updated resources in a shared cache. The shared cache can be located on a network computing provider 107 or on some other device in the networked computing environment 100. The shared cache can be an electronic data store, such as a database, memory, a hard disk, etc. In some cases, a resource will have an associated header which includes data about how long the resource can be cached. In some cases, the header may indicate that the resource should not be cached at all. The routine 1200 can choose to ignore such header data, and instead the routine 1200 can be configured to cache the resources each time they are checked in block 1208, above, and to keep the resources in cache for as long as they are current. In some embodiments, the routine 1200 can determine its own policies regarding how long to keep resources in cache and whether they should be stored in cache at all. For example, these policies can take into consideration the available space within the cache to determine whether and for how long to cache a resource. The available space can also be considered in conjunction with the popularity of the resource, as determined in block 1206. In such cases, the more popular resources can replace the less popular resources when the cache is at or near full capacity, while all resources can be kept in cache when the cache has ample extra storage space. In some cases, the resources are personalized for each end user, and are therefore storage in a shared cache may be inappropriate. The routine 1200 can determine which resources are personalized and which are generic, and can be configured to store only generic resources in the shared cache. In some embodiments, a personalized cache can be created for each end user, and personalized resources can be cached there. In some embodiments, the personalized cache can be created in addition to the shared cache that stores generic assets applicable to all users.

The routine 1200 can be implemented in any number of ways, and the description above is intended to be illustrative rather than limiting. For example, rather than determine popular sites based on prior browsing patterns, the routine 1200 can instead predict which resources will be accessed based the subject matter of popular sites, even though the predicted resources have not been accessed yet or are not yet associated with popular sites. In some embodiments, the routine 1200 can base its prediction on recommendations, trends, current events, etc.

Figure 13:
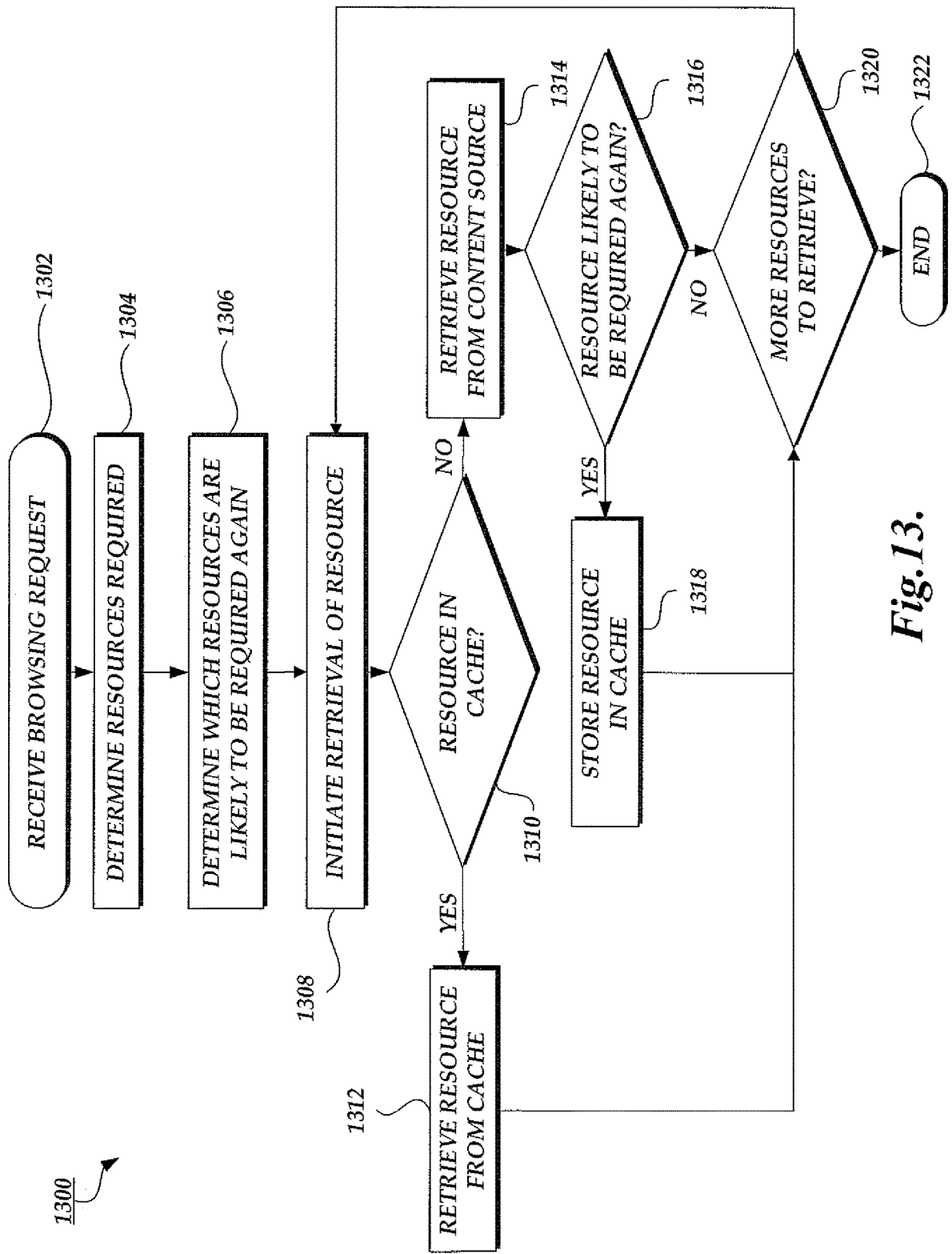
FIG. 13 is a flow diagram illustrative of a caching routine implemented by a network computing provider in response to a new browsing request.

FIG. 13 illustrates an example routine 1300 implemented by the network computing provider 107 to cache the resources that are most likely to be accessed again. The routine 1300 differs from the routine 1200 described above. Specifically, the routine 1300 executes while the network computing provider 107 is processing browsing requests and retrieving resources. The routine 1300 can predict which resources are most likely to be accessed again, caching those assets as they are accessed.

At block 1302, the predictive caching routine 1300 begins execution when the network computing provider 107 receives a browsing request. In one illustrative example, the network computing provider 107 receives a request, from a user of a client computing device 102, for the main page of a news web site.

The routine 1300 then proceeds to block 1304, where it determines the resources that are required to fulfill the browsing request, as described in detail above. Returning to the example above, when the network computing provider 107 receives a request for the main page of a news website, the network computing provider 107 can retrieve an HTML file for the main page from the origin server. As described herein, the network computing provider 107 can then process the HTML file and determine whether there are any embedded or otherwise related resources that will be required in order to fully respond to the browsing request by the client computing device 102. For example, there may be links in the HTML file to images, video clips of current news stores, applets, etc. that are required in order for the client computing device 102 to render the main page of the news web site as it was intended.

The routine 1300 then proceeds to block 1306 where it determines which of the resources required fulfill the browsing request received in block 1302 are likely to be required again in the future. The determination can be made using the techniques described above, with respect to FIG. 12. Specifically, the routine 1300 can use various techniques to recognize patterns in prior browsing data to determine whether any of the resources currently being processed are popular and therefore likely to be accessed again. For example, when the user requests the main page of a news web site, the routine can 1300 can recognize based on prior browsing history that logo images, background images, etc. will likely be required again because they have been required in the past when processing requests for this page.

While the routine 1300 illustrated in FIG. 13 focuses on the retrieval and caching of resources that are directly responsive to a browsing request, some embodiments may include the retrieval and caching of resources which are not required to respond to a browsing request. For example, the prior browsing data may show that the majority of users who request the main page of a news web site often proceed to request resources associated with the weather and sports portions of the news web site shortly thereafter. The routine 1300 can retrieve and cache those resources when the main page of the news web site is requested. In some embodiments, the routine 1300 can determine from prior browsing data that users who request a particular news site will also request similar yet separate news sites. The routine 1300 can be configured to cache resources from these separate news sites as well. In some embodiments, the routine 1300 can focus solely on the browsing history of the user initiating the browsing request received in block 1302.

When the routine 1300 has determined which resources will likely be required again, the routine 1300 then proceeds to block 1308, where it initiates the retrieval of the resources necessary to respond to the original browsing request received in block 1302. The retrieval can be performed sequentially or in parallel. For example, if the browsing request received in block 1302 is a request for the main page of a news web site, the routine 1300 can access and retrieve the HTML document responsive to that request. The routine 1300 can then process the HTML document to determine whether there are embedded resources that are also required, such as videos of news stories, applets, logos, and other images, and can initiate retrieval of those resources while still processing the HTML document. Each time the routine 1300 initiates retrieval of a resource in response to a browsing request, the routine 1300 proceeds to decision block 1310.

At decision block 1310, the routine 1300 determines whether the resource to be retrieved is present in the shared cache. If the resource is already in the shared cache—a cache hit—the routine 1300 proceeds to block 1312. If the resource is not in shared cache—a cache miss—the routine 1300 proceeds to block 1314.

When there is a cache hit, the routine proceeds to block 1312. At block 1312, the routine 1300 retrieves the current resource from the shared cache. The resource can then be sent directly to the client computing device 102, held at the network computing provider 107 for further processing, held for batch transmission along with other resources to the client computing device 102, etc. When the resource has been retrieved from the shared cache, the routine 1300 can proceed directly to decision block 1320.

When there is a cache miss, the routine proceeds to block 1314. At block 1314, the routine 1300 retrieves the resource from the content source, such as an origin server, a content provider or other networked resource provider. After the routine 1300 has retrieved the resource, the routine 1300 proceeds to decision block 1316, where it determines whether the resource is likely to be required again. This determination can be based on the determinations that were made in block 1306. Once the determination has been made, the routine 1300 will proceed to block 1318 if the resource is likely to be required again, or to decision block 1320 if it is not likely to be required again. For example, when the routine 1300 is processing a request for the main page of a news web site, a standard logo and an advertisement related to the user's geographical location may be retrieved. The routine 1300 can use prior browsing data to determine that the logo will likely be required again, and therefore the routine 1300 can proceed to block 1318 where the logo can be cached if it is not already present in the shared cache or if the logo has changed since it was last cached. The routine 1300 can use prior browsing data to determine that the local advertisement will not likely be accessed again, and can proceed to decision block 1320 instead.

When the resource is likely to be required again, the routine 1300 proceeds to block 1318 where it stores the resource in the shared cache. As described above, the shared cache can be an electronic data store, such as memory, a database, a hard disk, etc. The shared cache can be the same shared cache that is utilized in blocks 1310 and 1312. Such a configuration allows the routine 1300 to use the same cache for both storage and retrieval, improving likelihood that there will be a cache hit in future executions of the routine 1300. In some embodiments, the routine 1300 can take into consideration the available space within the cache to determine whether and for how long to cache a resource. The available space can also be considered in conjunction with the likelihood that the resource will be required again, as determined in block 1306. In such cases, the resources with a higher probability of being required again can replace those with a lower probability when the cache is at or near full capacity, while all resources can be kept in cache when the cache has ample extra storage space. After the resource has been stored in the cache, the routine 1300 proceeds to decision block 1320.

At decision block 1320, the routine 1300 determines whether there are more resources to retrieve in order to fulfill the browsing request. If there are, the routine 1300 returns to block 1308. If there are no other resources to retrieve, the routine 1300 can proceed to block 1322, where execution terminates.

A shared cache on the network computing provider 107 can help realize many of the benefits of caching. However, in order for the resources to be displayed on the client computing device 102, the resources are typically transmitted to the client computing device 102 for display there. In some embodiments, resources can be transmitted to the client computing device 102 in response to specific browsing requests. As described above with respect to FIG. 13, when an end user requests a particular resource, the network computing provider 107 can first check the shared cache and return the resource when there is a cache hit. Additional benefits can be realized by transmitting resources to the client computing device 102 before they are requested. For example, by transmitting popular resources to a client computing device 102 when a browsing session is initialized, rather than when the resources are requested, display of the resources at the client computing device 102 when they are finally requested can be expedited because the resource already resides on the client computing device 102 and no additional network transmission needs to take place between the client computing device 102 and the network computing provider 107.

Figure 14:
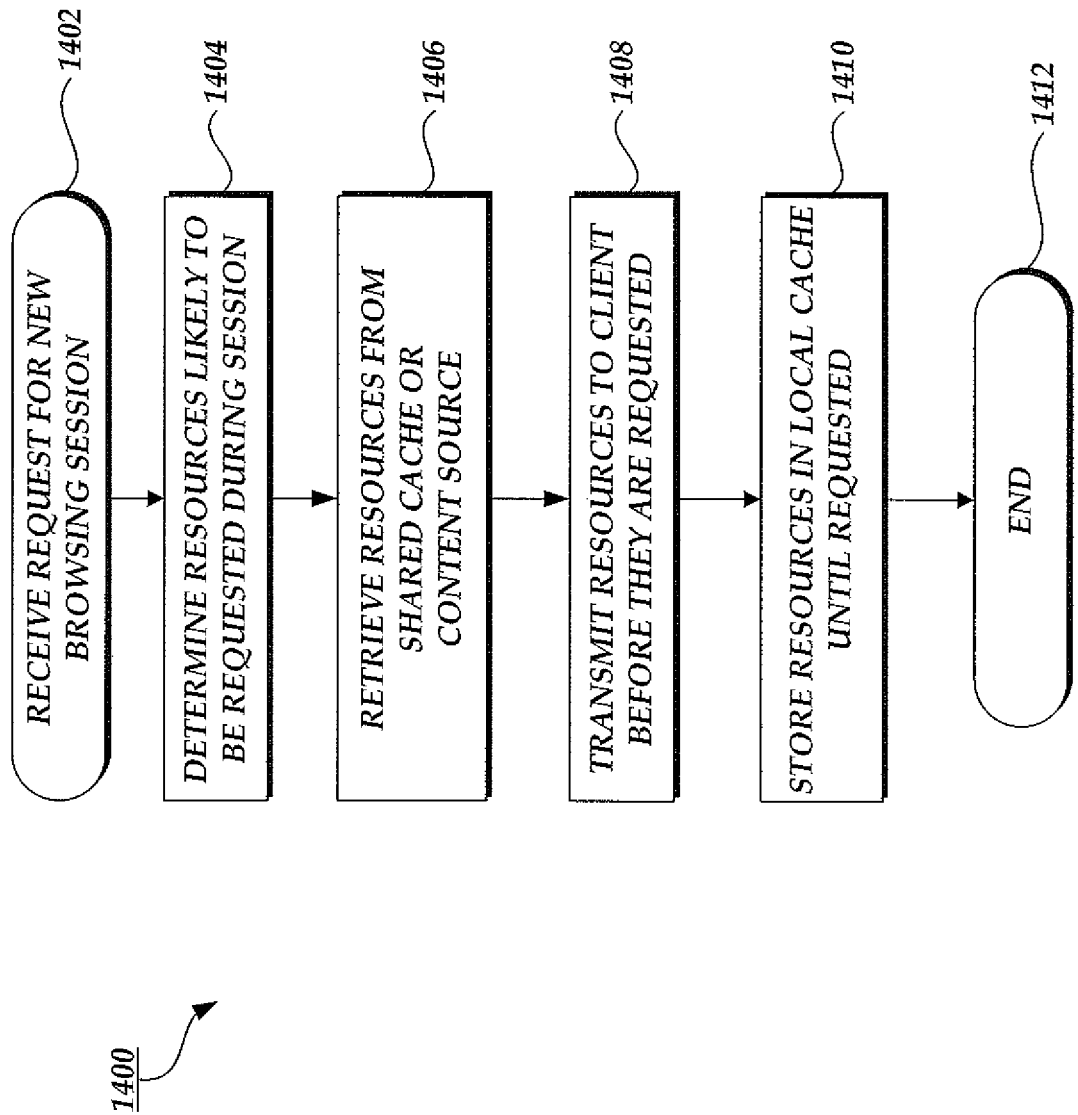
FIG. 14 is a flow diagram illustrative of a caching routine implemented by a network computing provider and a client computing device and executed in response to initialization of a new browsing session.

FIG. 14 illustrates an example routine 1400 for transmitting cached and newly acquired resources to a client computing device 102 in order to speed processing and reduce network traffic at the time a browsing request is made. Specifically, the routine 1400 transmits resources to the client computing device 102 before they are requested or are required to fulfill a request. A local cache on the client computing device 102 can store the resources until they are needed or until they expire or are otherwise discarded. The local cache can be an electronic data store, such as memory, a database, a hard drive, etc. Rules can be created so that the local cache does not exceed a certain size. Such rules can be advantageous when the client computing device 102 is configured with limited storage space when compared to the data store on a network computing provider 107.

The routine 1400 begins at block 1402, when the network computing provider 107 receives a request for a new browsing session from a client computing device 102. The process can begin with the generation and processing of a new browsing request from a client computing device 102 to a network computing provider 107. The client computing device 102 can load a browser for viewing network content in response to an event or user request. Subsequent to the browser being loaded, the browser may be configured to request a new browsing session. In some embodiments, the request for a new browsing session may be automatic upon browser load, or may be the result of an event such as a command or request from the user of the client computing device. The routine 1400 then proceeds to block 1404.

At block 1404, the routine 1400 determines which assets are likely to be accessed during the browsing session. This determination can be based on the previous browsing history of the end user making the request. The determination can also be based on the previous browsing history of a set of end users. As described above, any number techniques may be used to analyze prior browsing history in order to recognize patterns and determine which resources are most likely to be accessed in the future. The routine 1400 can predict which previously requested resources will be requested again. The routine 1400 can also predict resources that have not been accessed before. In one example, a user of a client computing device 102 has a history of accessing certain network resources during a majority of browsing sessions, such as a news web site, a sports web site, and a social media web site. When that user initiates a new browsing session, the network computing provider 107 can determine that those network resources will be requested during the current browsing session.

The routine 1400 then proceeds to block 1406, where the network computing provider 107 retrieves assets from the shared cache or from the content source, such as a content provider 104, CDN provider 106, origin server, etc. The routine 1400 can incorporate a subroutine similar to the routine 1300 described above, wherein the network computing provider 107 iteratively processes a list of resources, checking the shared cache for each resource. When there is a cache hit, the routine 1400 can retrieve the resource from cache. When there is a cache miss, the routine 1400 can retrieve the resource from its content source. When the routine 1400 has retrieved the resource from its content source, it can store it in the shared cache on the network computing provider 107 to improve the cache hit rate of future executions of the routines described herein. Returning to the example described with respect to block 1404, the network computing provider 107 can retrieve resources associated with the news web site, sports web site, and social media web site that the user has a history of requesting. The resources can be stored in shared cache. In some embodiments, a personalized cache can be created for an end user, and such assets can be stored in the personalized cache on the network computing provider 107 instead of the shared cache. Such a configuration can provide flexibility in determining policies related to maintaining the personalized cache on a user-by-user basis.

The routine 1400 then proceeds to block 1408, where the network computing provider 107 transmits the resources to the client computing device 102, in some cases before the resources are requested. Each resource can be transmitted immediately upon retrieval, either from the shared cache or from its content source. When this option is used, the routine 1400 can then return to block 1406 to retrieve the next resource. Alternatively, the transmission step can be performed in parallel. In such a configuration, block 1406 can initiate the block 1408 transmission when each resource is retrieved, while continuing execution of block 1406 to retrieve the next resource. In some embodiments, the resources can be held in a temporary data store and transmitted to the client computing device 102 as a group. In some embodiments, resources can continue to be transmitted to the client computing device 102 throughout the browsing session in an effort to create a robust local cache on the client computing device 102. In some embodiments the transmission can be configured to proceed only when there is excess network capacity available so as to avoid interfering with operations initiated by the end user. In some embodiments the transmission can be configured to proceed only when the client computing device 102 is utilizing a wired connection to the network or only when the client computing device 102 is plugged into an electrical outlet in order to avoid excessive battery drain and/or data transmission costs. In some embodiments, a header associated with the network resource can be inspected, and only those network resources which have a relatively long cache life can be transmitted to the client computing device 102. Such a configuration can conserve resources by opting not to transmit and/or cache resources that will likely expire before they are requested by the client computing device 102. Returning to the example user browsing session described above, when the end user is initiating a browsing session on a mobile phone, the resources can be held in the shared cache on the network computing provider 107 until requested by the user. When the user initiates a browsing session from a desktop computer over a wired connection, the resources can be transmitted to the desktop computer for storage in local cache before any resource has been requested.

When resources are transmitted to the client computing device 102, the routine 1400 proceeds to block 1410. At block 1410, the client computing device 102 stores the assets in a local cache until needed. The local cache at the client computing device 102 can be an electronic data store such as a database, memory, a hard drive, etc. The local cache can be a single cache where all cached resources are stored. In some embodiments, there are two or more separate local caches at the client computing device 102, or a single cache with two or more distinct areas. In such configurations, one local cache or cache area can store resources which have been specifically requested by the end user and which, therefore, are likely to be accessed again. Another local cache or cache area can store the resources which have not been requested by the end user, but rather those which have been transmitted to the client computing device 102 in anticipation of being requested in the future based on trends in past browsing history. Similar to block 1408, above, the storage that happens in block 1410 can happen in a single action, when the client computing device 102 receives all resources to be cached in a single transmission. In other embodiments, block 1410 will be executed to store each individual resource as it is received. When all resources have been received and cached at the client computing device 102, the routine 1400 proceeds to block 1412, where execution terminates.

Figure 15:
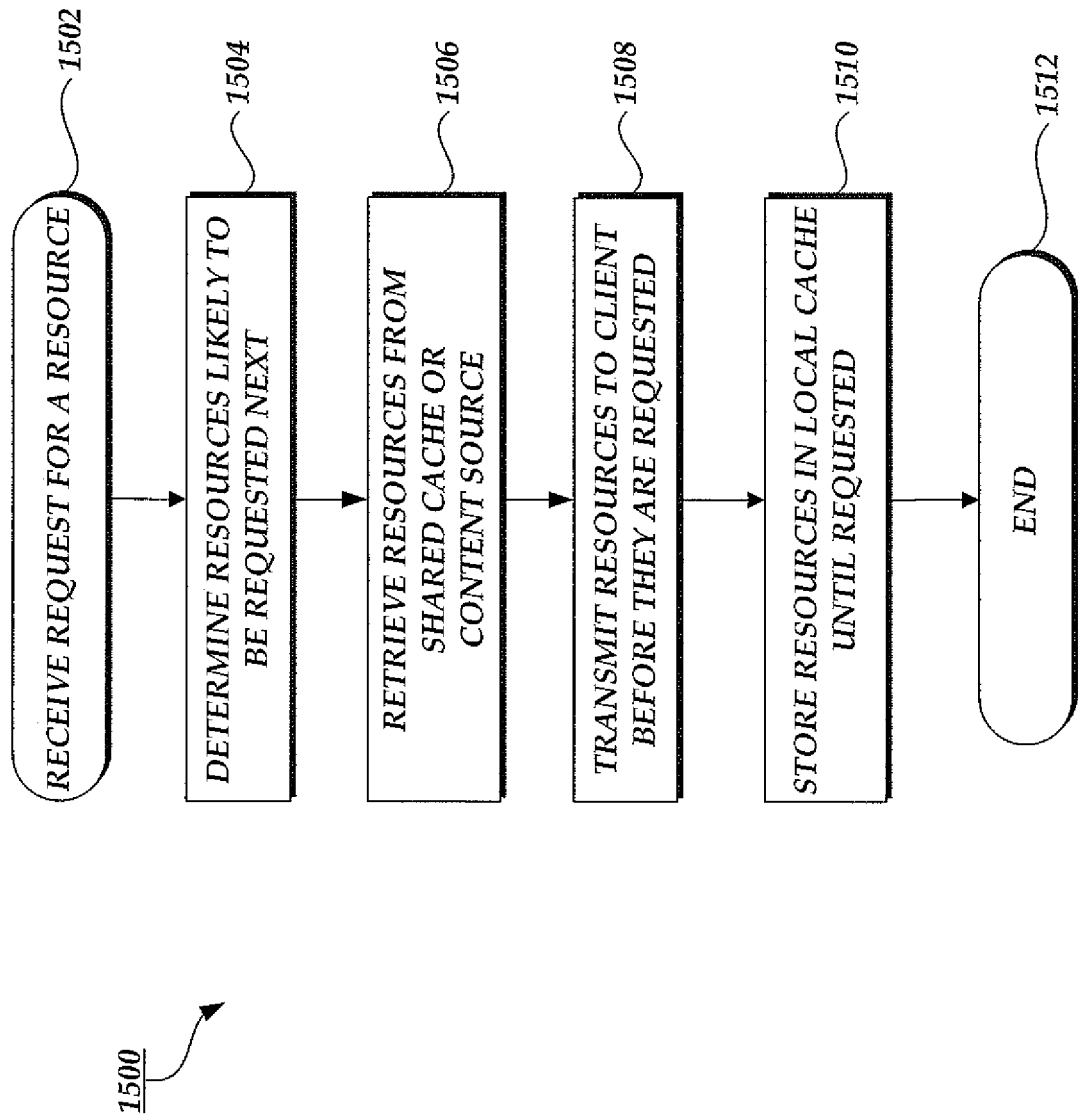
FIG. 15 is a flow diagram illustrative of a caching routine implemented by a network computing provider and a client computing device and executed in response to a new browsing request.

FIG. 15 illustrates an example routine 1500 implemented by the network computing provider 107 and the client computing device 102 in order to speed the retrieval of resources by a browser program running on a client computing device 102. The routine 1500 illustrated in FIG. 15 differs from the routine 1400 described above. Specifically, the routine 1500 transmits resources to the client computing device 102 when a browsing request is made for a particular resource. The routine 1500 predicts which resources the user will request next in the current browsing session based on a particular browsing request and patterns in browsing history data.

The routine 1500 begins at block 1502, when the network computing provider 107 receives a request for a new resource during an existing browsing session. For example, the request can be for the main page of a news web site. The routine 1500 then proceeds to block 1504.

At block 1504, the routine 1500 determines the resources that are likely to be accessed soon after the browsing request that was received in block 1502. In the current example, the browsing request is for main page of a news web site. In previous browsing sessions of the same end user or a group of end users, the browsing history data indicates that users who request the main page of the news web site will request the current events page soon thereafter. In some embodiments, the routine 1500 can also determine likely follow up resources from separate sources. In the current example, such follow up resources can include the main page from other news sites.

The routine 1500 then proceeds to block 1506, where the network computing provider 107 retrieves the resources, determined by block 1504 as being likely to be accessed, from shared cache or the content source, such as a content provider 104, CDN provider 106, origin server, etc. As described above, the network computing provider 107 can first look in the shared cache for the resource. If there is a cache hit, the routine can retrieve the resource from cache. When there is a cache miss, the network computing provider 107 can retrieve the resource from its content source. The network computing provider 107 can cache the resource to increase the cache hit rate during subsequent executions of the routine 1500. In some embodiments, the network computing provider 107 can be configured to only retrieve resources from the shared cache; when there is a cache miss, the network computing provider 107 does not retrieve the resource form its content source.

The routine 1500 then proceeds to block 1508, where the network computing provider 107 can transmit the resources to the client computing device 102. As described above, the resources can be transmitted as they are retrieved. In some embodiments, the resources can be held until a group of resources has been retrieved, and then the group can be transmitted to the client computing device 102 as a whole. As described above, the resources can also be transmitted to the client computing device 102 in parallel, while the routine 1500 is executing block 1506. In some embodiments, the routine 1500 can be configured to continue predicting which resources the user is likely to request and to transmit those resources to the client computing device 102 until a new browsing request is received, during which the routine can begin execution again at block 1502. Such a procedure can build a robust local cache at the client computing device 102. As described above, this constant transmission can be avoided when the client computing device 102 is low on storage capability, is not utilizing a wired network connection, or is running on battery power, all in an effort to conserve storage space and battery life and to avoid excessive data transmission fees.

The routine 1500 then proceeds to block 1510, where the client computing device 102 can store the assets until they are needed. As described above, the client computing device 102 can store the resources in a local cache. The local cache at the client computing device 102 can be an electronic data store such as a database, memory, a hard drive, etc. The local cache can be a single cache where all cached resources are stored. In some embodiments, there can be two or more caches at the client computing device 102, or a single cache with two or more distinct areas. One local cache or cache area can be dedicated to the storage of resources that the end user has accessed in the past. Another local cache or cache area can be dedicated to the storage of resources that the end user is predicted to access in the future. The resources stored in the predicted local cache can be removed from cache on an expedited basis as the routine 1500 examines the user's browsing patterns and tends to make more accurate predictions. When all resources have been received, the routine 1500 can proceed to block 1512, where termination executes.

The routines described herein are merely illustrative and are not intended to be limiting. For example, the blocks of various routines can be executed in a different order without departing from the scope of the disclosure. The various routines can also incorporate the blocks of various other routines without departing from the scope of the disclosure.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system configured to manage caching of a network resource in a networked computing environment, the system comprising a processor and a memory, wherein the processor executes computer-executable instructions stored in the memory to:
- determine predicted network resources, wherein individual predicted network resources are associated with a probability of being requested by individual client devices in a first geographic region, wherein the predicted network resources are determined based at least in part on historical information identifying resource requests in a plurality of resource requests received in the first geographic region, and wherein the predicted network resources are selected from network resources associated with a probability greater than a threshold probability based at least in part on the historical information; and a caching component comprising one or more computing devices configured to:
- in response to receiving a request from a client computing device at a first geographic location for a network resource and determining that the requested network resource is not cached:
  - determine that the first geographic location is within the first geographic region;
  - identify a predicted network resource associated with the requested network resource, wherein the predicted network resource is associated with the requested network resource based at least in part on the historical information, and wherein the predicted network resource is associated with a first probability of being requested that is determined based at least in part on the first geographic region;
  - determine, based at least in part on an expiry header associated with the predicted network resource, a second probability that the predicted network resource will expire before it is requested;
  - obtain the requested network resource and the predicted network resource;
  - cache the predicted network resource based at least in part on the first probability and the second probability; and
  - provide, to the client computing device, the predicted network resource independently of a request from the client computing device for the predicted network resource.

2. The system of claim 1, wherein the predicted network resource comprises a web page.

3. The system of claim 1, wherein the plurality of resource requests received in the first geographic region does not comprise the predicted network resource.

4. A computer-implemented method for caching network resources in a networked computing environment, the method, implemented by one or more computing devices configured with specific executable instructions, comprising:
- analyzing a plurality of historical browsing request records to prioritize predicted network resources for a first user in a first geographic region, wherein individual predicted network resources are associated with a probability of being requested that is greater than a threshold probability based on the plurality of historical browsing request records, and wherein individual request records of the plurality of historical browsing request records are associated with the first geographic region;
- in response to receiving a request from a client computing device for a network resource and determining that the requested network resource is not cached:
  - determining that a location of the client computing device is within the first geographic region;
  - identifying a predicted network resource associated with the requested network resource, the predicted network resource being associated with the requested network resource based on the plurality of historical browsing request records and the first geographic region, the predicted network resource being associated with a first probability of being requested;
  - determining, based at least in part on an expiry header associated with the predicted network resource, a second probability that the predicted network resource will expire before it is requested;
  - obtaining the requested network resource and the predicted network resource;
  - caching the predicted network resource based at least in part on the first and second probabilities; and
  - providing, to the client computing device, the predicted network resource independent of a request for the predicted network resource.

5. The computer-implemented method of claim 4, wherein the probability of being requested is based at least in part on content of the predicted network resource.

6. The computer-implemented method of claim 4, wherein the probability of being requested varies based at least in part on a time of day.

7. The computer-implemented method of claim 4, wherein the probability of being requested is based at least in part on a number of times the predicted network resource and a second network resource have been requested over a time period.

8. The computer-implemented method of claim 4, wherein the probability of being requested is based at least in part on information associated with popularity, and wherein a prioritization of the predicted network resource is based at least on an average of number of requests for a network resource over a time period.

9. The computer-implemented method of claim 4, wherein at least a portion of the predicted network resource are cached in an electronic data store, and wherein the electronic data store has an available capacity.

10. The computer-implemented method of claim 9, further comprising determining whether to cache the predicted network resource based at least in part on a prioritization of the predicted network resource and the available capacity of the electronic data store.

11. The computer-implemented method of claim 4, wherein the predicted network resource does not comprise a network resource requested from the client computing device.

12. The computer-implemented method of claim 4, wherein the predicted network resource is not a network resource represented by the plurality of historical browsing request records.

13. The computer-implemented method of claim 4, wherein the predicted network resource comprises at least one of a web page, image, video, applet, or document.

14. The computer-implemented method of claim 4, wherein providing the predicted network resource further comprises removing versions of network resources from a portion of a cache of the client computing device associated with predicted network resources based at least partly on browsing patterns of a user of the client computing device.

15. A computer-implemented method for caching a network resource for transmission over a network to a client computing device, the method, as implemented by one or more network computing providers configured with specific executable instructions, comprising:
- analyzing a plurality of historical browsing request records to determine predicted network resources for a first user in a first geographic region, wherein individual predicted network resources are associated with a probability of being requested that is greater than a threshold probability based on the plurality of historical browsing request records;
- caching a predicted network resource on a network computing provider, wherein the network computing provider is not a client computing device, and wherein caching the predicted network resource comprises:
    - determining that a location of the client computing device is associated with the first geographic region;
    - identifying the predicted network resource based at least in part on a requested network resource, the first geographic region, and the plurality of historical browsing request records;
    - obtaining the requested network resource;
    - determining, based at least in part on an expiry header associated with the predicted network resource that a probability that the predicted network resource will be requested before it expires exceeds a threshold; and
    - transmitting the predicted network resource to a first cache of the client computing device prior to receiving a request, from the client computing device, for the predicted network resource.

16. The computer-implemented method of claim 15 further comprising causing storage of the predicted network resource in the first cache.

17. The computer-implemented method of claim 15, wherein the probability of being requested is based at least in part on content of the predicted network resource.

18. The computer-implemented method of claim 15, wherein the probability of being requested varies based at least in part on a time of day.

19. The computer-implemented method of claim 15, wherein the probability of being requested is based at least on a number of times the predicted network resource and a second network resource have been requested over the same time period.

20. The computer-implemented method of claim 15, wherein the probability of being requested is greater than the threshold probability when the network resource has been requested a greater number of times over a time period than an average of number of requests for a network resource over the time period.

21. The computer-implemented method of claim 15, further comprising determining whether to cache the predicted network resource based at least in part on an available capacity of the network computing provider.

22. The computer-implemented method of claim 15, wherein the predicted network resource comprises a web page, image, video, applet, or document.

* * * * *